United States Patent
Wood

(10) Patent No.: US 7,821,869 B2
(45) Date of Patent: *Oct. 26, 2010

(54) METHODS OF ENHANCING SEPARATION OF PRIMARY REFLECTION SIGNALS AND NOISE IN SEISMIC DATA USING RADON TRANSFORMATIONS

(75) Inventor: Lawrence C. Wood, Houston, TX (US)

(73) Assignee: John M. Robinson, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/456,734

(22) Filed: Jun. 22, 2009
(Under 37 CFR 1.47)

(65) Prior Publication Data

US 2009/0285052 A1    Nov. 19, 2009

Related U.S. Application Data

(60) Division of application No. 11/075,326, filed on Mar. 8, 2005, now Pat. No. 7,564,740, which is a continuation of application No. 10/238,366, filed on Sep. 10, 2002, now Pat. No. 6,987,706, which is a continuation-in-part of application No. 10/232,118, filed on Aug. 30, 2002, now Pat. No. 6,691,039.

(51) Int. Cl.
G01V 1/38    (2006.01)

(52) U.S. Cl. .............................. 367/24; 367/43; 367/46; 367/47; 367/49

(58) Field of Classification Search .................. 367/24, 367/43, 46, 47, 49
See application file for complete search history.

(56) References Cited

U.S. PATENT DOCUMENTS 4,594,693 A    6/1986   Pann et al. ..................... 367/43

(Continued)

FOREIGN PATENT DOCUMENTS

EP    0 515 189 A2    11/1992

(Continued)

OTHER PUBLICATIONS

Guitton, Antoine. "Prestack multiple attenuation using the hyperbolic Radon transform: A comparison of inversion schemes." Stanford Exploration Project, Report 103, Apr. 27, 2000.*

(Continued)

*Primary Examiner*—Mark Hellner
(74) *Attorney, Agent, or Firm*—Keith B Willhelm

(57) ABSTRACT

Improved methods of processing seismic data which comprise amplitude data assembled in the offset-time domain in which primary reflection signals and noise overlap are provided for. The methods include the step of enhancing the separation between primary reflection signals and coherent noise by transforming the assembled data from the offset-time domain to the time-slowness domain. More specifically, the assembled amplitude data are transformed from the offset-time domain to the time-slowness domain using a Radon transformation according to an index j of the slowness set and a sampling variable $\Delta p$; wherein $$j = \frac{p_{max} - p_{min} + 1 \; \mu sec/m}{\Delta p},$$

$\Delta p$ is from about 0.5 to about 4.0 $\mu$sec/m, $p_{max}$ is a predetermined maximum slowness, and $p_{min}$ is a predetermined minimum slowness. Alternately, an offset weighting factor $x^n$ is applied to the assembled amplitude data, wherein $0 < n < 1$, and the amplitude data are transformed with a Radon transformation. The assembled amplitude data also may be transformed with a Radon transformation applied within defined slowness limits $p_{min}$ and $p_{max}$, where $p_{min}$ is a predetermined minimum slowness and $p_{max}$ is a predetermined maximum slowness, with a hyperbolic Radon transformation, or, as applied to data which have been uncorrected for normal moveout, with a hyperbolic or parabolic Radon transformation. Thus, the primary reflection signals and coherent noise transform into different regions of the time-slowness domain to enhance the separation therebetween.

69 Claims, 24 Drawing Sheets
(4 of 24 Drawing Sheet(s) Filed in Color)

U.S. PATENT DOCUMENTS

| | | | | |
|---|---|---|---|---|
| 4,628,492 A * | 12/1986 | Winney | ........................ | 367/63 |
| 4,860,265 A | 8/1989 | Laster et al. | ................... | 367/73 |
| 5,138,583 A * | 8/1992 | Wason et al. | ................... | 367/38 |
| 5,189,644 A * | 2/1993 | Wood | .......................... | 367/38 |
| 5,572,483 A * | 11/1996 | Chambers et al. | ............. | 367/45 |
| 5,583,825 A | 12/1996 | Carrazzone et al. | | |
| 5,642,327 A | 6/1997 | Schiflett et al. | | |
| 5,719,822 A * | 2/1998 | Wang | .......................... | 367/53 |
| 5,909,655 A | 6/1999 | Canadas et al. | ............... | 702/17 |
| 5,920,828 A * | 7/1999 | Norris et al. | ................... | 702/14 |
| 5,970,023 A * | 10/1999 | Chambers et al. | ............. | 367/63 |
| 6,018,500 A * | 1/2000 | Chambers | .................... | 367/73 |
| 6,094,620 A * | 7/2000 | Gasparotto et al. | ............ | 702/14 |
| 6,208,587 B1 * | 3/2001 | Martin | ........................ | 367/50 |
| 6,446,007 B1 * | 9/2002 | Finn et al. | ..................... | 702/14 |
| 6,507,787 B1 | 1/2003 | Ferreira da Silva et al. | | |
| 6,574,567 B2 * | 6/2003 | Martinez | ..................... | 702/17 |
| 6,636,810 B1 * | 10/2003 | Moore et al. | ................... | 702/17 |
| 6,651,007 B2 * | 11/2003 | Ozbek | .......................... | 702/17 |
| 6,668,228 B1 * | 12/2003 | Ozbek et al. | ................... | 702/17 |
| 6,691,039 B1 * | 2/2004 | Wood | .......................... | 702/17 |
| 6,721,662 B2 * | 4/2004 | Wood | .......................... | 702/17 |
| 6,735,528 B2 * | 5/2004 | Wood et al. | .................... | 702/17 |
| 6,738,715 B2 * | 5/2004 | Shatilo et al. | ................. | 702/17 |
| 6,763,304 B2 * | 7/2004 | Schonewille | ................. | 702/14 |
| 6,832,161 B1 * | 12/2004 | Moore | .......................... | 702/17 |
| 6,987,706 B2 * | 1/2006 | Wood | .......................... | 367/43 |
| 7,239,578 B2 | 7/2007 | Robinson | .................... | 367/43 |
| 7,366,054 B1 | 4/2008 | Wood | .......................... | 367/43 |
| 7,561,491 B2 | 7/2009 | Robinson | .................... | 367/43 |
| 7,564,740 B2 | 7/2009 | Wood | .......................... | 367/43 |
| 2002/0118602 A1 * | 8/2002 | Sen et al. | .................... | 367/151 |
| 2002/0138202 A1 * | 9/2002 | Martinez | ..................... | 702/17 |
| 2002/0156583 A1 * | 10/2002 | Sen et al. | ..................... | 702/17 |
| 2003/0055569 A1 * | 3/2003 | Shatilo et al. | ................. | 702/17 |
| 2004/0044480 A1 * | 3/2004 | Wood | .......................... | 702/17 |
| 2004/0117122 A1 * | 6/2004 | Choo et al. | ................... | 702/14 |
| 2009/0005999 A1 | 1/2009 | Wood | .......................... | 702/17 |
| 2009/0262602 A1 | 10/2009 | Robinson | .................... | 367/43 |

FOREIGN PATENT DOCUMENTS

| | | |
|---|---|---|
| EP | 1094339 | 4/2001 |
| FR | 2801387 | 5/2001 |
| WO | 00/42448 | 7/2000 |
| WO | 02/059649 A1 | 8/2002 |
| WO | 2004/020972 A2 | 3/2004 |

OTHER PUBLICATIONS

Mitchell, et al. "Efficient tau-p hyperbolic velocity filtering." Geophysics, vol. 55, No. 5 (May 1990).*

Trad, et al. "Accurate interpolation with high-resolution time-variant Radon transforms." Geophysics, vol. 67, No. 2 (Mar.-Apr. 2002).*

Office Action, U.S. Pat. No. 6,691,039, U.S. Appl. No. 10/232,118, mailed Jul. 16, 2003.

Office Action, U.S. Pat. No. 6,721,662, U.S. Appl. No. 10/238,461, mailed Aug. 13, 2003.

Office Action, U.S. Pat. No. 6,735,528, U.S. Appl. No. 10/238,212, mailed Aug. 6, 2003.

Office Action, U.S. Pat. No. 6,987,706, U.S. Appl. No. 10/238,366, mailed May 11, 2004.

Office Action, U.S. Pat. No. 7,239,578, U.S. Appl. No. 11/070,943, mailed Nov. 8, 2006.

Office Action, U.S. Pat. No. 7,561,491, U.S. Appl. No. 11/072,472, mailed Jul. 3, 2006.

Office Action, U.S. Pat. No. 7,561,491, U.S. Appl. No. 11/072,472, mailed Nov. 27, 2006.

Office Action, U.S. Pat. No. 7,561,491, U.S. Appl. No. 11/072,472, mailed Mar. 16, 2007.

Office Action, U.S. Pat. No. 7,561,491, U.S. Appl. No. 11/072,472, mailed Jul. 20, 2007.

Office Action, U.S. Pat. No. 7,561,491, U.S. Appl. No. 11/072,472, mailed Jan. 24, 2008.

Office Action, U.S. Pat. No. 7,561,491, U.S. Appl. No. 11/072,472, mailed Mar. 19, 2008.

Office Action, U.S. Pat. No. 7,561,491, U.S. Appl. No. 11/072,472, mailed Oct. 14, 2008.

Advisory Office Action, U.S. Pat. No. 7,561,491, U.S. Appl. No. 11/072,472, mailed Apr. 2, 2009.

Office Action, U.S. Pat. No. 7,564,740, U.S. Appl. No. 11/075,326, mailed Jun. 26, 2007.

Office Action, U.S. Pat. No. 7,564,740, U.S. Appl. No. 11/075,326, mailed Feb. 11, 2008.

Office Action, U.S. Pat. No. 7,564,740, U.S. Appl. No. 11/075,326, mailed Jun. 24, 2008.

Office Action, U.S. Pat. No. 7,564,740, U.S. Appl. No. 11/075,326, mailed Oct. 31, 2008.

Advisory Office Action, U.S. Pat. No. 7,564,740, U.S. Appl. No. 11/075,326, mailed Apr. 8, 2009.

Office Action, U.S. Pat. No. 7,366,054, U.S. Appl. No. 11/647,935, mailed Jul. 20, 2007.

Office Action, U.S. Publ. Appl. No. 2009/0005999, U.S. Appl. No. 11/700,663, mailed Feb. 6, 2009.

Office Action, U.S. Publ. Appl. No. 2009/0005999, U.S. Appl. No. 11/700,663, mailed Nov. 23, 2009.

Office Action, U.S. Publ. Appl. No. 2009/0262602, U.S. Appl. No. 12/456,743, mailed Sep. 18, 2009.

Belkin, Gregory, *Discrete Radon Transform*, IEEE Transactions on Acoustics Speech and Signal Processing, vol. AASP-35, pp. 162-172 (1987).

Bergler, Steffen et al., *Hyperbolic Reflection Moveout Revisited*, EAGE 1951-2001 (2001).

Bickel, S.H., *Focusing Aspects of the Hyperbolic Radon Transform*, 65(2) Geophysics 652-55 (2000).

Brandsberg-Dahl, S. et al., *AVA (Amplitude Versus Angle) Analysis and Compensation on Common Image Gathers in the Angle Domain*, 63$^{rd}$ EAGE Conference (Amsterdam 2001) (abstract).

Dix, C. H., *Seismic Velocities from Surface Measurements*, 20(1) Geophysics 68-86 (1955).

Durbaum, H., *Zur Bestimmung von Wellengeschwindigkeiten aus Reflexionsseismischen Messungen*, 2(2) Geophys.Prosp. 151-76 (1954).

*Focus*, Version 5.0, "Help" printouts (Paradigm Geophysical Corp. 2001).

Fokkema, J. T. et al., *The Pre-Stack Image Map of Surface Seismic Data in the Horizontal Time-Vertical Time Domain*, 54$^{th}$ EAGE Conference (Paris 1992). (abstract).

Foster, D.J., et al., *Suppression of Multiple Reflections using the Radon Transform*, 57(3) Geophysics 386-95 (1992).

Guitton, A., *Prestack Multiple Attenuation Using the Hyperbolic Radon Transform*, Stanford Exploration Project, Report 103, pp. 123-195 (Apr. 27, 2000).

Hagedoorn, H., *A Process of Seismic Reflection Interpretation*, 2(2) Geophys.Prosp. 85-127 (1954).

Hampson, D., *Inverse Velocity Stacking for Multiple Elimination*, 22 J.Can.Soc.Expl.Geophys. 44-45 (1986).

Hampson, D., *The Discrete Radon Transform: A New Tool for Image Enhancement and Noise Suppression*, Society of Exploration Geophysicists 57$^{th}$ Annual International Meeting, Expanded Abstracts pp. 141-143.

Hargreaves, Neil et al., *High-Resolution Radon Demultiple*, Society of Exploration Geophysicists International Exposition and 71$^{st}$ Annual Meeting, Expanded Abstracts with Biographies vol. I, pp. 1325-1338 (Tulsa, Oklahoma, Society of Exploration Geophysicists, Sep. 9-14, 2001).

Herrman, P., et al., *De-Aliased, High-Resolution Radon Transforms*, Society of Exploration Geophysicists 70$^{th}$ Annual International Meeting, SP2.3 (2000).

Krey, T., *An Approximate Correction Method for Refraction in Reflection Seismic Prospecting*, 16(3) Geophysics 468-85 (1951).

Krey, T., *Bemerkungen zu Einer Formel für Geschwindigkeitsbestimmungen aus Seismischen Messungen von C. H. Dix*, 7 Erdol and Kohle 8-9 (1954).

Marfurt, K.J., et al., *Pitfalls of Using Conventional and Discrete Radon Transforms on Poorly Sampled Data*, 61(5) Geophysics 1467-82 (1996).

Marzetta, T. L., *Fan Filters, the 3-D Radon Transform, and Image Sequence Analysis*, 3 (No. 3) IEE Transactions on Image Processing 253-64 (1994).

Mayne, W. H., *Common Reflection Point Horizontal Data Stacking Techniques*, 27(6) Geophysics 927-38 (1962).

Mitchell, A. R. et al., *Efficient Tau-P Hyperbolic Velocity Filtering*, 55 Geophysics 619-25 (1990).

Moon, W., et al., *Radon Transform Wave Field Separation for Vertical Seismic Profiling Data*, 51 (No. 4) Geophysics 940-47 (1986).

Nural Kabir, N.M., et al., *Toward True Amplitude Multiple Removal*, The Leading Edge 66-73 (Jan. 1999).

O'Brien, P. N. S., et al., *Velocity Dispersion of Seismic Waves*, 19 Geophysical Prospecting 1-26 (1971).

*ProMax 3D*, vol. 1, Version 6.0, pp. 929-933 (1995).

Sacchi, M. D., *Aperture Compensated Radon and Fourier Transforms*, PhD Thesis, British Columbia University (1996) (abstract).

Sacchi, M. D., et al., *Fast High Resolution Parabolic Radon Transform*, Society of Exploration Geophysicists 69$^{th}$ Annual International Meeting, SPRO P1.1 (1999).

Sacchi, M. D., et al., *High-Resolution Velocity Gathers and Offset Space Reconstruction*, 60(4) Geophysics 1169-1177 (1995).

Sacchi, M.D., et al., *Simultaneous Signal and Noise Modeling Via the Radon Transformation*, 66$^{rd}$ EAGE Conference (Paris Jun. 10, 2004).

Schonewille, M.A., et al., *Parabolic Radon Transform, Sampling and Efficiency*, 66(2) Geophysics 667-78 (2001).

Shah, P. M., *Use of Wavefront Curvature to Relate Seismic Data with Subsurface Parameters*, 38(5) Geophysics 812-825 (1973).

Shultz, P.S., "A Method for Direct Estimation of Interval Velocities," 47 *Geophysics* 1657-71 (1982).

Spitzer, Roman, et al., *Enhancing Subbasalt Reflections Using Parabolic τ-p Transformation*, The Leading Edge 1184-1201 (Dec. 2003).

Spitzer, Roman, et al., *Reducing Source-Generated Noise in Shallow Seismic Data Using Linear and Hyperbolic τ-p Transformations*, 66 (No. 5) Geophysics 1612-21 (2001).

Thorson, J. R. et al., *Velocity-Stack and Slant-Stack Stochastic Inversion*, 50 Geophysics 2727-41 (1985).

Trad, D.O., et al., *Accurate Interpolation with High-Resolution Time-Variant Radon Transforms*, 67(2) Geophysics 644-56 (2002).

Yilmaz, Ozdogan, Seismic Data Analysis: Processing, Inversion, and Interpretation of Seismic Data, vol. 1, pp. 938-948 (Tulsa, Oklahoma, Society of Exploration Geophysicists, 2001).

\* cited by examiner

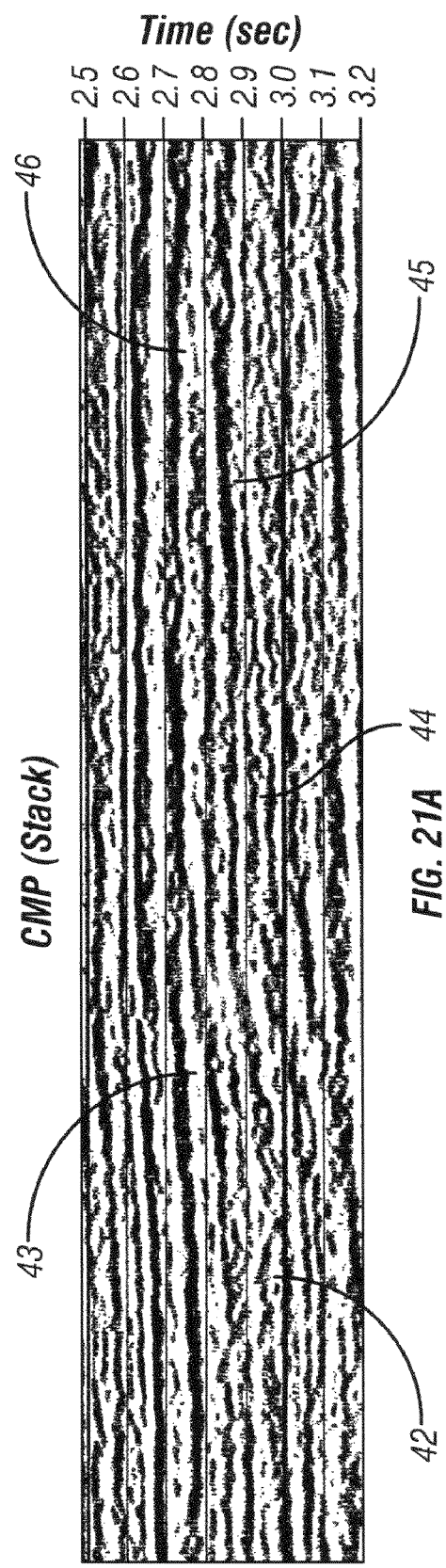

METHODS OF ENHANCING SEPARATION OF PRIMARY REFLECTION SIGNALS AND NOISE IN SEISMIC DATA USING RADON TRANSFORMATIONS

CLAIM TO PRIORITY

This application is a divisional of an application of John M. Robinson, Rule 47(b) applicant, entitled "Methods of Enhancing Separation of Primary Reflection Signals and Noise in Seismic Data Using Radon Transformations," U.S. Ser. No. 11/075,326, filed Mar. 8, 2005, now U.S. Pat. No. 7,564,740 which is a continuation of an application of John M. Robinson, Rule 47(b) applicant, entitled "Removal of Noise from Seismic Data Using High Resolution Radon Transformations," U.S. Ser. No. 10/238,366, filed Sep. 10, 2002, now U.S. Pat. No. 6,987,706, which is a continuation-in-part of an application of John M. Robinson, Rule 47(b) Applicant, entitled "Removal of Noise from Seismic Data Using Improved Radon Transformations," U.S. Ser. No. 10/232,118, filed Aug. 30, 2002, now U.S. Pat. No. 6,691,039.

BACKGROUND OF THE INVENTION

The present invention relates to processing of seismic data representative of subsurface features in the earth and, more particularly, to improved methods of processing seismic data using high resolution Radon transformations to remove unwanted noise from meaningful reflection signals.

Seismic surveys are one of the most important techniques for discovering the presence of oil and gas deposits. If the data are properly processed and interpreted, a seismic survey can give geologists a picture of subsurface geological features, so that they may better identify those features capable of holding oil and gas. Drilling is extremely expensive, and ever more so as easily tapped reservoirs are exhausted and new reservoirs are harder to reach. Having an accurate picture of an area's subsurface features can increase the odds of hitting an economically recoverable reserve and decrease the odds of wasting money and effort on a nonproductive well.

The principle behind seismology is deceptively simple. As seismic waves travel through the earth, portions of that energy are reflected back to the surface as the energy waves traverse different geological layers. Those seismic echoes or reflections give valuable information about the depth and arrangement of the formations, some of which hopefully contain oil or gas deposits.

A seismic survey is conducted by deploying an array of energy sources and an array of sensors or receivers in an area of interest. Typically, dynamite charges are used as sources for land surveys, and air guns are used for marine surveys. The sources are discharged in a predetermined sequence, sending seismic energy waves into the earth. The reflections from those energy waves or "signals" then are detected by the array of sensors. Each sensor records the amplitude of incoming signals over time at that particular location. Since the physical location of the sources and receivers is known, the time it takes for a reflection signal to travel from a source to a sensor is directly related to the depth of the formation that caused the reflection. Thus, the amplitude data from the array of sensors can be analyzed to determine the size and location of potential deposits.

This analysis typically starts by organizing the data from the array of sensors into common geometry gathers. That is, data from a number of sensors that share a common geometry are analyzed together. A gather will provide information about a particular spot or profile in the area being surveyed. Ultimately, the data will be organized into many different gathers and processed before the analysis is completed and the entire survey area mapped.

The types of gathers typically used include: common midpoint, where the sensors and their respective sources share a common midpoint; common source, where all the sensors share a common source; common offset, where all the sensors and their respective sources have the same separation or "offset"; and common receiver, where a number of sources share a common receiver. Common midpoint gathers are the most common gather today because they allow the measurement of a single point on a reflective subsurface feature from multiple source-receiver pairs, thus increasing the accuracy of the depth calculated for that feature.

The data in a gather are typically recorded or first assembled in the offset-time domain. That is, the amplitude data recorded at each of the receivers in the gather are assembled or displayed together as a function of offset, i.e., the distance of the receiver from a reference point, and as a function of time. The time required for a given signal to reach and be detected by successive receivers is a function of its velocity and the distance traveled. Those functions are referred to as kinematic travel time trajectories. Thus, at least in theory, when the gathered data are displayed in the offset-time domain, or "X-T" domain, the amplitude peaks corresponding to reflection signals detected at the gathered sensors should align into patterns that mirror the kinematic travel time trajectories. It is from those trajectories that one ultimately may determine an estimate of the depths at which formations exist.

A number of factors, however, make the practice of seismology and, especially, the interpretation of seismic data much more complicated than its basic principles. First, the reflected signals that indicate the presence of geological strata typically are mixed with a variety of noise.

The most meaningful signals are the so-called primary reflection signals, those signals that travel down to the reflective surface and then back up to a receiver. When a source is discharged, however, a portion of the signal travels directly to receivers without reflecting off of any subsurface features. In addition, a signal may bounce off of a subsurface feature, bounce off the surface, and then bounce off the same or another subsurface feature, one or more times, creating so-called multiple reflection signals. Other portions of the signal turn into noise as part of ground roll, refractions, and unresolvable scattered events. Some noise, both random and coherent, is generated by natural and man-made events outside the control of the survey.

All of this noise is occurring simultaneously with the reflection signals that indicate subsurface features. Thus, the noise and reflection signals tend to overlap when the survey data are displayed in X-T space. The overlap can mask primary reflection signals and make it difficult or impossible to identify patterns in the display upon which inferences about subsurface geology may be drawn. Accordingly, various mathematical methods have been developed to process seismic data in such a way that noise is separated from primary reflection signals.

Many such methods seek to achieve a separation of signal and noise by transforming the data from the X-T domain to other domains. In other domains, such as the frequency-wavenumber (F-K) domain or the time-slowness (tau-P), there is less overlap between the signal and noise data. Once the data are transformed, various mathematical filters are applied to the transformed data to eliminate as much of the noise as possible and, thereby, to enhance the primary reflection signals. The data then are inverse transformed back into the offset-time domain for interpretation or further processing.

For example, so-called Radon filters are commonly used to attenuate or remove multiple reflection signals. Such methods rely on Radon transformation equations to transform data from the offset-time (X-T) domain to the time-slowness (tau-P) where it can be filtered. More specifically, the X-T data are transformed along kinematic travel time trajectories having constant velocities and slownesses, where slowness p is defined as reciprocal velocity (or p=1/v).

Such prior art Radon methods, however, typically first process the data to compensate for the increase in travel time as sensors are further removed from the source. This step is referred to as normal moveout or "NMO" correction. It is designed to eliminate the differences in time that exist between the primary reflection signals recorded at close-in receivers, i.e., at near offsets, and those recorded at remote receivers, i.e., at far offsets. Primary signals, after NMO correction, generally will transform into the tau-P domain at or near zero slowness. Thus, a mute filter may be defined and applied in the tau-P domain. The filter mutes, i.e., excludes all data, including the transformed primary signals, below a defined slowness value $p_{mute}$.

The data that remain after applying the mute filter contains a substantial portion of the signals corresponding to multiple reflections. That unmuted data are then transformed back into offset-time space and are subtracted from the original data in the gather. The subtraction process removes the multiple reflection signals from the data gather, leaving the primary reflection signals more readily apparent and easier to interpret.

It will be appreciated, however, that in such prior art Radon filters, noise and multiple reflection signals recorded by receivers close to the gather reference point ("near trace multiples") are not as effectively separated from the primary reflections. The lack of separation in large part is an artifact of the NMO correction performed prior to transformation. Because NMO correction tends to eliminate offset time differences in primary signals, primary signals and near trace multiple signals both transform at or near zero slowness in the tau-P domain. When the mute filter is applied, therefore, the near trace multiples are muted along with the primary signal. Since they are muted, near trace multiples are not subtracted from and remain in the original data gather as noise that can mask primary reflection signals.

Radon filters have been developed for use in connection with common source, common receiver, common offset, and common midpoint gathers. They include those based on linear slant-stack, parabolic, and hyperbolic kinematic travel time trajectories. The general case forward transformation equation used in Radon filtration processes, R(p,τ)[d(x,t)], is set forth below:

$$u(p, \tau) = \int_{-\infty}^{\infty} dx \int_{-\infty}^{\infty} dt d(x, t) \delta[f(t, x, \tau, p)]$$

(forward transformation)

where
u(p,τ)=transform coefficient at slowness p and zero-offset time τ
d(x,t)=measured seismogram at offset x and two-way time t
p=slowness t=two-way travel time
τ=two-way intercept time at p=0
x=offset
δ=Dirac delta function
f(t,x,τ,p)=forward transform function The forward transform function for linear slant stack kinematic travel time trajectories is as follows:

$$f(t,x,\tau,p)=t-\tau-px$$

where $$\delta[f(t, x, \tau, p)] = \delta(t - \tau - px)$$

$$= 1, \text{ when } t = \tau + px, \text{ and}$$

$$= 0, \text{ elsewhere.}$$

Thus, the forward linear slant stack Radon transformation equation becomes $$u(p, \tau) = \int_{-\infty}^{\infty} dx d(x, \tau + px)$$

The forward transform function for parabolic kinematic trajectories is as follows:

$$f(t,x,\tau,p)=t-\tau-px^2$$

where $$\delta[f(t, x, \tau, p)] = \delta(t - \tau - px^2)$$

$$= 1, \text{ when } t = \tau + px^2, \text{ and}$$

$$= 0, \text{ elsewhere.}$$

Thus, the forward parabolic Radon transformation equation becomes $$u(p, \tau) = \int_{-\infty}^{\infty} dx d(x, \tau + px^2)$$

The forward transform function for hyperbolic kinematic travel time trajectories is as follows:

$$f(t,x,\tau,p)=t-\sqrt{\tau^2+p^2x^2}$$

where $$\delta[f(t, x, \tau, p)] = \delta\left(t - \sqrt{\tau^2 + p^2x^2}\right)$$

$$= 1, \text{ when } t = \sqrt{\tau^2 + p^2x^2}, \text{ and}$$

$$= 0, \text{ elsewhere.}$$

Thus, the forward hyperbolic Radon transformation equation becomes $$u(p, \tau) = \int_{-\infty}^{\infty} dx\, d\left(x, \sqrt{\tau^2 + p^2 x^2}\right)$$

A general case inverse Radon transformation equation is set forth below:

$$d(x, t) = \int_{-\infty}^{\infty} dp \int_{-\infty}^{\infty} d\tau \rho(\tau) * u(p, \tau) \delta[g(t, x, \tau, p)]$$

(inverse transformation)

where
 $g(t,x,\tau,p)$=inverse transform function, and
 $\rho(\tau)*$=convolution of rho filter.

The inverse transform function for linear slant stack kinematic trajectories is as follows:

$g(t,x,\tau,p)=\tau-t+px$

Thus, when $\tau=t-px$, the inverse linear slant stack Radon transformation equation becomes $$d(x, t) = \int_{-\infty}^{\infty} dp\, \rho(\tau) * u(p, t - px)$$

The inverse transform function for parabolic trajectories is as follows:

$g(t,x,\tau,p)=\tau-t+px^2$

Thus, when $\tau=t-px^2$, the inverse parabolic Radon transformation equation becomes $$d(x, t) = \int_{-\infty}^{\infty} dp\, \rho(\tau) * u(p, t - px^2)$$

The inverse transform function for hyperbolic trajectories is as follows:

$g(t,x,\tau,p)=\tau-\sqrt{t^2-p^2x^2}$

Thus, when $\tau=\sqrt{t^2-p^2x^2}$, the inverse hyperbolic Radon transformation equation becomes $$d(x, t) = \int_{-\infty}^{\infty} dp\, \rho(\tau) * u\left(p, \sqrt{t^2 - p^2 x^2}\right)$$

The choice of which form of Radon transformation preferably is guided by the travel time trajectory at which signals of interest in the data are recorded. Common midpoint gathers, because they offer greater accuracy by measuring a single point from multiple source-receiver pairs, are preferred over other types of gathers. Primary reflection signals in a common midpoint gather generally will have hyperbolic kinematic trajectories. Thus, it would be preferable to use hyperbolic Radon transforms.

To date, however, Radon transformations based on linear slant stack and parabolic trajectories have been more commonly used. The transform function for hyperbolic trajectories contains a square root whereas those for linear slant stack and parabolic transform functions do not. Thus, the computational intensity of hyperbolic Radon transformations has in large part discouraged their use in seismic processing.

It has not been practical to accommodate the added complexity of hyperbolic Radon transformations because the computational requirements of conventional processes are already substantial. NMO correction involves a least-mean-squares ("LMS") energy minimization calculation. Forward and inverse Radon transforms also are not exact inverses of each other. Accordingly, an additional LMS calculation is often used in the transformation. Those calculations in general and, especially LMS analyses, are complex and require substantial computing time, even on advanced computer systems.

Moreover, a typical seismic survey may involve hundreds of sources and receivers, thus generating tremendous quantities of raw data. The data may be subjected to thousands of different data gathers. Each gather is subjected not only to filtering processes as described above, but in all likelihood to many other enhancement processes as well. For example, data are typically processed to compensate for the diminution in amplitude as a signal travels through the earth ("amplitude balancing"). Then, once the individual gathers have been filtered, they must be "stacked", or compiled with other gathers, and subjected to further processing in order to make inferences about subsurface formations. Seismic processing by prior art Radon methods, therefore, requires substantial and costly computational resources, and there is a continuing need for more efficient and economical processing methods.

It is understood, of course, that the transformation, NMO correction, and various other mathematical processes used in seismic processing do not necessarily operate on all possible data points in the gather. Instead, and more typically, those processes may simply sample the data. For example, the transform functions in Radon transformations are based on variables t, x, $\tau$, and p. The transformations, however, will not necessarily be performed at all possible values for each variable. Instead, the data will be sampled a specified number of times, where the number of samples for a particular variable may be referred to as the index for the variable set. For example, k, l, m, and j may be defined as the number of samples in, or the index of, respectively, the time (t), offset (x), tau ($\tau$), and slowness (p) sets. The samples will be taken at specified intervals, $\Delta t$, $\Delta x$, $\Delta \tau$, and $\Delta p$. Those intervals are referred to as sampling variables.

The magnitude of the sampling variables, the variable domain and all other factors being equal, will determine the number of operations or samples that will be performed in the transformation and the accuracy of the transformation. As the sampling variables become finer, i.e., smaller, the number of samples increases and so does the accuracy. By making the sampling variables larger, or coarser, the number of samples is reduced, but the accuracy of the transformation is reduced as well.

In large part because of the computational intensity of those processes, however, the sampling variables used in prior art Radon processes can be relatively coarse. In NMO correction, for example, industry typically samples at $\Delta t$ values several time greater than that at which the field data were recorded, i.e., in the range of 20-40 milliseconds, and samples at $\Delta v$ values of from about 15 to about 120 m/sec. To the extent that the sampling variables are greater than the data acquisition sample rates, data are effectively discarded and the accuracy of the process is diminished. In the Radon transformation itself, prior art methods typically set $\Delta t$, $\Delta \tau$, and $\Delta x$ at the corresponding sample rates at which the data were recorded, i.e., in the range of 2 to 4 milliseconds and 25 to 400 meters or more, respectively. $\Delta p$ is relatively coarse, however, typically being set at values in the range of 4-24 μsec/m. Also, the index j of the slowness (p) set usually is equal to the fold of the offset data, i.e., the number of source-receiver pairs in the survey, which typically ranges from about 20 to about 120.

Accordingly, prior art methods may rely on additional computations in an attempt to compensate for the loss of accuracy and resolution inherent in coarse sampling variables. For example, the LMS analysis applied in NMO correction and prior art Radon transformations are believed to obviate the need for finer sampling variables. Certain prior art processes utilize trace interpolation, thereby nominally reducing $\Delta x$ values, but the additional "data" are approximations of what would be recorded at particular offsets between the offsets where receivers were actually located. Relative inaccuracy in processing individual data gathers also is believed to be acceptable because the data from a large number of gathers ultimately are combined for analysis, or "stacked". Nevertheless, there also is a continuing need for more accurate processing of seismic data and processes having finer resolutions.

The velocity at which primary reflection signals are traveling, what is referred to as the stacking velocity, is used in various analytical methods that are applied to seismic data. For example, it is used in determining the depth and lithology or sediment type of geological formations in the survey area. It also is used various seismic attribute analyses. A stacking velocity function may be determined by what is referred to as a semblance analysis. Which such methods have provided reasonable estimations of the stacking velocity function for a data set, given the many applications based thereon, it is desirable to define the stacking velocity function as precisely as possible.

An object of this invention, therefore, is to provide a method for processing seismic data that more effectively removes unwanted noise from meaningful reflection signals.

It also is an object to provide such methods based on hyperbolic Radon transformations.

Another object of this invention is to provide methods for removal of noise from seismic data that are comparatively simple and require relatively less computing time and resources.

Yet another object is to provide methods for more accurately defining the stacking velocity function for a data set.

It is a further object of this invention to provide such methods wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides for methods of processing seismic data to remove unwanted noise from meaningful reflection signals indicative of subsurface formations. The methods comprise the steps of obtaining field records of seismic data detected at a number of seismic receivers in an area of interest. The seismic data comprise signal amplitude data recorded over time by each of the receivers and contains both primary reflection signals and unwanted noise events. The seismic data are assembled into common geometry gathers in an offset-time domain.

The amplitude data are then transformed from the offset-time domain to the time-slowness domain using a high resolution Radon transformation. That is, the Radon transformation is performed according to an index j of the slowness set and a sampling variable $\Delta p$; wherein $$j = \frac{p_{max} - p_{min} + 1 \text{ μsec/m}}{\Delta p},$$

$\Delta p$ is from about 0.5 to about 4.0 μsec/m, $p_{max}$ is a predetermined maximum slowness, and $p_{min}$ is a predetermined minimum slowness. Preferably, an offset weighting factor $x^n$ is applied to the amplitude data, wherein $0<n<1$.

Such Radon transformations include the following continuous transform equation, and discrete versions thereof that approximate the continuous transform equation:

$$u(p, \tau) = \int_{-\infty}^{\infty} dx \int_{-\infty}^{\infty} dt d(x, t) x^n \delta[f(t, x, \tau, p)]$$

Radon transformations based on linear slant stack, parabolic, and other non-hyperbolic kinematic travel time trajectories may be used, but those based on hyperbolic Radon kinematic trajectories are preferred. Suitable hyperbolic Radon transformations include the following continuous transform equation, and discrete versions thereof that approximate the continuous transform equation:

$$u(p, \tau) = \int_{-\infty}^{\infty} dx x^n d\left(x, \sqrt{\tau^2 + p^2 x^2}\right)$$

Preferably, the Radon transformation is applied within defined slowness limits $p_{min}$ and $p_{max}$, where $p_{min}$ is a predetermined minimum slowness and $p_{max}$ is a predetermined maximum slowness.

A corrective filter is then applied to the transformed data to enhance the primary reflection signal content of the data and to eliminate unwanted noise events. Preferably, the corrective filter is a time variant, high-low filter, and it determined by reference to the velocity function derived from performing a semblance analysis or a pre-stack time migration analysis on the amplitude data.

After filtering, the enhanced signal content is inverse transformed from the time-slowness domain back to the offset-time domain using an inverse Radon transformation, and, if necessary, an inverse of the offset weighting factor $p^n$ is applied to the inverse transformed data, wherein $0<n<1$. Such Radon transformations include the following continuous inverse transform equation, and discrete versions thereof that approximate the continuous inverse transform equation:

$$d(x, t) = \int_{-\infty}^{\infty} dp \int_{-\infty}^{\infty} d\tau p^n \rho(\tau) * u(p, \tau) \delta[g(t, x, \tau, p)]$$

Suitable hyperbolic inverse Radon transformations include the following continuous inverse transform equation, and discrete versions thereof that approximate the continuous inverse transform equation:

$$d(x, t) = \int_{-\infty}^{\infty} dp\, p^n \rho(\tau) * u\left(p, \sqrt{t^2 - p^2 x^2}\right)$$

The signal amplitude data for the enhanced signal content are thereby restored. The processed and filtered data may then be subject to further processing by which inferences about the subsurface geology of the survey area may be made.

It will be appreciated that the Radon transformations utilized in the subject invention offer higher resolution as compared to prior art Radon filters. $\Delta p$ typically is from about 0.5 to about 4.0 µsec/m. A $\Delta p$ of about 1.0 µsec/m is most preferably used. Slowness limit $p_{max}$, which is used to determine the index j of the slowness set, generally is greater than the slowness of reflection signals from the shallowest reflective surface of interest. The minimum slowness limit, $p_{min}$, generally is less than the slowness of reflection signals from the deepest reflective surface of interest. Typically, the minimum and maximum limits $p_{min}$ and $p_{max}$ will be set within 20% below (for minimum limits) or above (for maximum limits) of the slownesses of the pertinent reflection signals, or more preferably, within 10% or 5% thereof. The specific values for the slowness limits $p_{min}$ and $p_{max}$ will depend on the data recorded in the survey, but typically, therefore, j preferably is from about 125 to about 1000, most preferably from about 250 to about 1000.

It will be appreciated that primarily because they utilize a high resolution Radon transformation, and avoid more complex mathematical operations required by prior art processes, the novel methods provide enhanced accuracy, yet require less total computation time and resources. Thus, even though hyperbolic Radon transformations heretofore have generally been avoided because of their greater complexity relative to linear slant stack and parabolic Radon transformations, the novel processes are able to more effectively utilize hyperbolic Radon transformations and take advantage of the greater accuracy they can provide, especially when applied to common midpoint geometry gathers.

The subject invention also provides for improved methods of processing seismic data which comprise amplitude data assembled in the offset-time domain in which primary reflection signals and noise overlap. The methods include the step of enhancing the separation between primary reflection signals and coherent noise by transforming the assembled data from the offset-time domain to the time-slowness domain.

More specifically, the assembled amplitude data are transformed from the offset-time domain to the time-slowness domain using a Radon transformation according to an index j of the slowness set and a sampling variable $\Delta p$; wherein $$j = \frac{p_{max} - p_{min} + 1 \text{ µsec/m}}{\Delta p},$$

$\Delta p$ is from about 0.5 to about 4.0 µsec/m, $p_{max}$ is a predetermined maximum slowness, and $p_{min}$ is a predetermined minimum slowness. Alternately, an offset weighting factor $x^n$ is applied to the assembled amplitude data, wherein $0<n<1$, and the amplitude data are transformed with a Radon transformation. The assembled amplitude data also may be transformed with a Radon transformation applied within defined slowness limits $p_{min}$ and $p_{max}$, where $p_{min}$ is a predetermined minimum slowness and $p_{max}$ is a predetermined maximum slowness, with a hyperbolic Radon transformation, or, as applied to data which have been uncorrected for normal moveout, with a hyperbolic or parabolic Radon transformation. Thus, the primary reflection signals and coherent noise transform into different regions of the time-slowness domain to enhance the separation therebetween. The enhanced separation is thereafter used in the processing to facilitate the ultimate diminishing of coherent noise in the data relative to primary reflection signals, and thereby, to make interpretation of the data more accurate and reliable.

The subject invention also provides for methods for determining a stacking velocity function. The methods comprise the steps of processing and filtering the data as described above. A semblance analysis is performed on the restored data to generate a refined semblance plot, and a velocity analysis is performed on the refined semblance plot to define a refined stacking velocity function. Preferably, an offset weighting factor $x^n$ is first applied to the restored amplitude data, wherein $0<n<1$.

It will be appreciated that, because the semblance and velocity analysis is performed on data that have been more accurately processed and filtered, that the resulting stacking velocity function is more accurate. This enhances the accuracy of the many different seismic processing methods that utilize stacking velocity functions. Ultimately, the increased accuracy and efficiency of the novel processes enhances the accuracy of surveying underground geological features and; therefore, the likelihood of accurately locating the presence of oil and gas deposits.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIG. 21A is an enlargement of the area shown in box 21A of FIG. 21.

DESCRIPTION OF ILLUSTRATIVE EMBODIMENTS

The subject invention is directed to improved methods for processing seismic data to remove unwanted noise from meaningful reflection signals and for more accurately determining the stacking velocity function for a set of seismic data.

Obtaining and Preparing Seismic Data for Processing

More particularly, the novel methods comprise the step of obtaining field records of seismic data detected at a number of seismic receivers in an area of interest. The seismic data comprise signal amplitude data recorded over time and contains both primary reflection signals and unwanted noise events.

Figure 1:
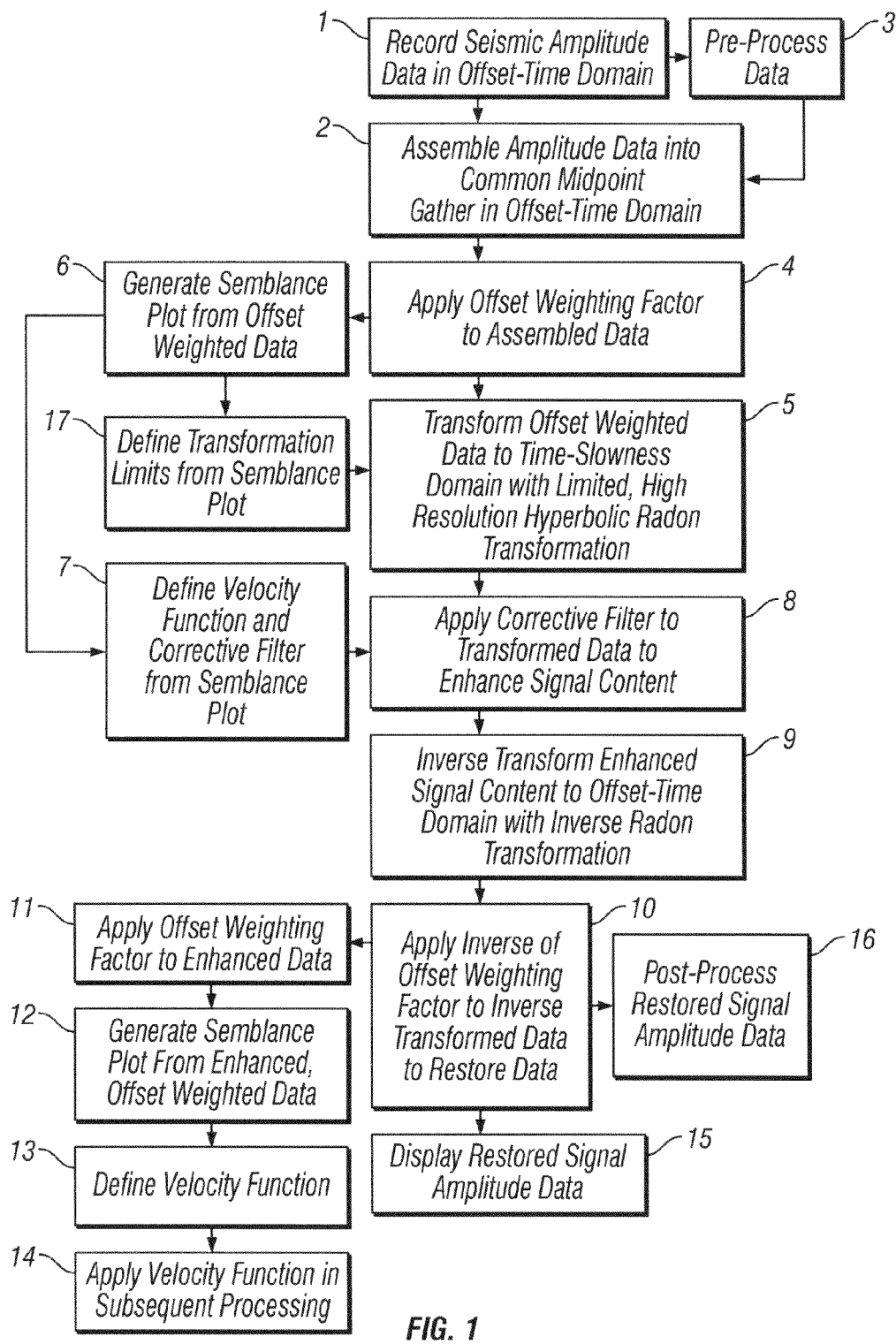
FIG. 1 is a schematic diagram of a preferred embodiment of the methods of the subject invention showing a sequence of steps for enhancing the primary reflection signal content of seismic data and for attenuating unwanted noise events, thereby rendering it more indicative of subsurface formations.

By way of example, a preferred embodiment of the methods of the subject invention is shown in the flow chart of FIG. 1. As shown therein in step 1, seismic amplitude data are recorded in the offset-time domain. For example, such data may be generated by a seismic survey shown schematically in FIG. 2.

Figure 2:
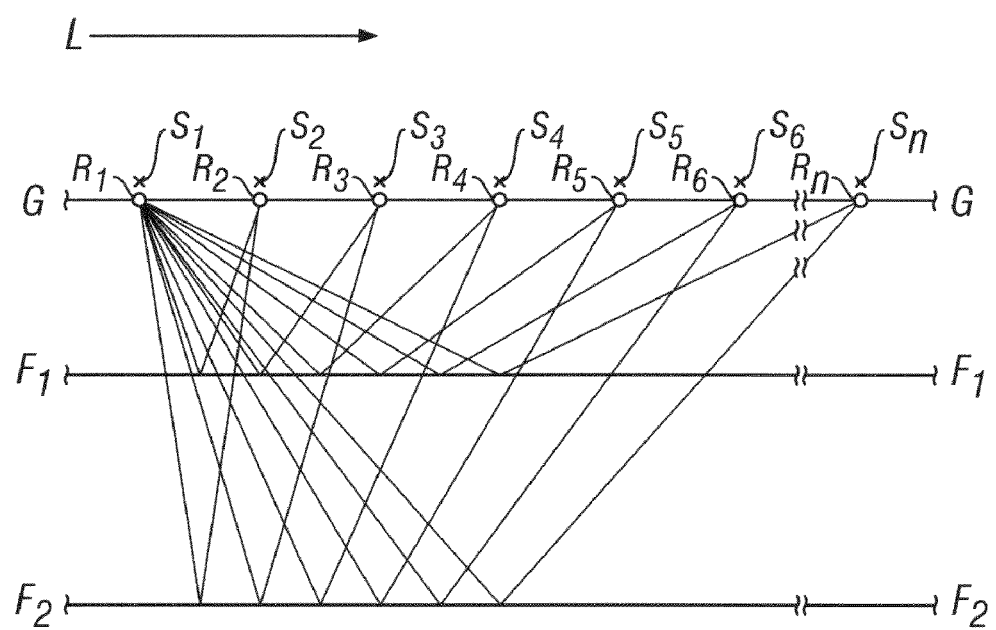
FIG. 2 is a schematic diagram of a two-dimensional seismic survey in which field records of seismic data are obtained at a number of seismic receivers along a profile of interest.

The seismic survey shown in FIG. 2 is a two-dimensional survey in offset-time (X-T) space along a seismic line of profile L. A number of seismic sources $S_n$ and receivers $R_n$ are laid out over a land surface G along profile L. The seismic sources $S_n$ are detonated in a predetermined sequence. As they are discharged, seismic energy is released as energy waves. The seismic energy waves or "signals" travel downward through the earth where they encounter subsurface geological formations, such as formations $F_1$ and $F_2$ shown schematically in FIG. 2. As they do, a portion of the signal is reflected back upwardly to the receivers $R_n$. The paths of such primary reflection signals from $S_1$ to the receivers $R_n$ are shown in FIG. 2.

The receivers $R_n$ sense the amplitude of incoming signals and digitally record the amplitude data over time for subsequent processing. Those amplitude data recordations are referred to as traces. It will be appreciated that the traces recorded by receivers $R_n$ is include both primary reflection signals of interest, such as those shown in FIG. 2, and unwanted noise events.

It also should be understood that the seismic survey depicted schematically in FIG. 2 is a simplified one presented for illustrative purposes. Actual surveys typically include a considerably larger number of sources and receivers. Further, the survey may taken on land or over a body of water. The seismic sources usually are dynamite charges if the survey is being done on land, and geophones are used. Air guns are typically used for marine surveys along with hydrophones. The survey may also be a three-dimensional survey over a surface area of interest rather than a two-dimensional survey along a profile as shown.

Figure 3:
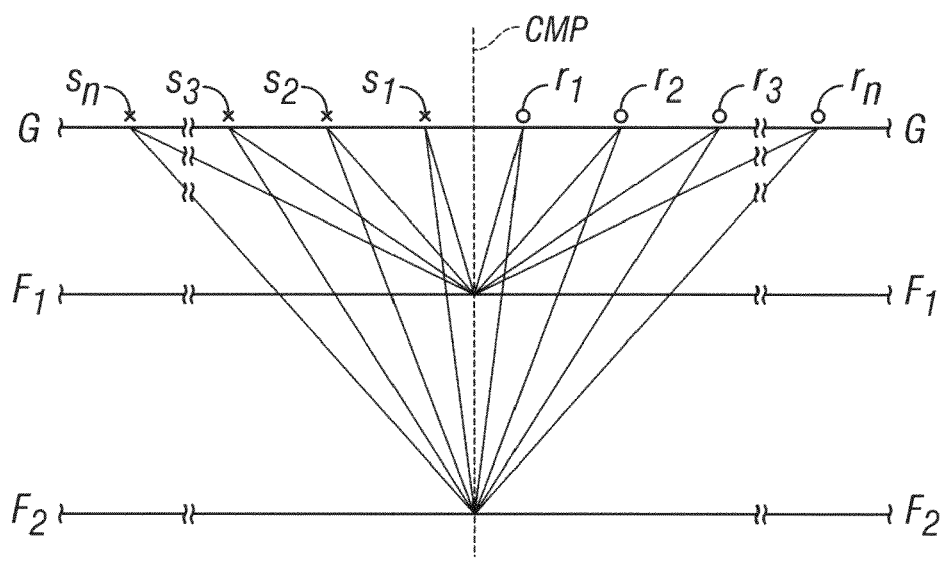
FIG. 3 is a schematic diagram of a seismic survey depicting a common midpoint geometry gather.

In accordance with the subject invention, the seismic data are assembled into common geometry gathers in an offset-time domain. For example, in step 2 of the preferred method of FIG. 1, the seismic amplitude data are assembled in the offset-time domain as a common midpoint gather. That is, as shown schematically in FIG. 3, midpoint CMP is located halfway between source $s_1$ and receiver $r_1$. Source $s_2$ and receiver $r_2$ share the same midpoint CMP, as do all pairs of sources $s_n$ and receivers $r_n$ in the survey. Thus, it will be appreciated that all source $s_n$ and receiver $r_n$ pairs are measuring single points on subsurface formations $F_n$. The traces from each receiver $r_n$ in those pairs are then assembled or "gathered" for processing.

It will be appreciated, however, that other types of gathers are known by workers in the art and may be used in the subject invention. For example, the seismic data may be assembled into common source, common receiver, and common offset gathers and subsequently processed to enhance signal content and attenuate noise.

It also will be appreciated that the field data may be processed by other methods for other purposes before being processed in accordance with the subject invention as shown in step 3 of FIG. 1. The appropriateness of first subjecting the data to amplitude balancing or other conventional pre-processing, such as spherical divergence correction and absorption compensation, will depend on various geologic, geophysical, and other conditions well known to workers in the art. The methods of the subject invention may be applied to raw, unprocessed data or to data preprocessed by any number of well-known methods. As will become apparent from the discussion that follows, however, it is preferred that the data not be NMO corrected, or if preprocessed by a method that relies on NMO correction, that the NMO correction be reversed, prior to transformation of the data. Otherwise, it is not practical to design and apply high-low filters or to utilize limited Radon transformations as described below.

Transformation of Data

Once the data are assembled, the methods of the subject invention further comprise the step of transforming the offset weighted amplitude data from the offset-time domain to the time-slowness domain using a high resolution Radon transformation. Specifically, the transformation is performed according to an index j of the slowness set and a sampling variable $\Delta p$, wherein $$j = \frac{p_{max} - p_{min} + 1 \; \mu sec/m}{\Delta p},$$

$\Delta p$ is from about 0.5 to about 4.0 μsec/m, $p_{max}$ is a predetermined maximum slowness, and $p_{min}$ is a predetermined minimum slowness. $\Delta p$ preferably is from about 0.5 to about 3.0 μsec/m, and more preferably, is from about 0.5 to about 2.0 μsec/m. A $\Delta p$ of about 1.0 μsec/m is most preferably used.

Preferably, an offset weighting factor $x^n$ is applied to the amplitude data to equalize amplitudes in the seismic data across offset values and to emphasize normal amplitude moveout differences between desired reflection signals and unwanted noise, wherein $0<n<1$. It also is preferred that the Radon transformation be applied within defined slowness limits $p_{min}$ and $p_{max}$, where $p_{min}$ is a predetermined minimum slowness and $p_{max}$ is a predetermined maximum slowness. By limiting the transformation in that manner, it is more efficient and effective. The slowness limits $p_{min}$ and $p_{max}$ preferably are determined by reference to a velocity function derived by performing a semblance analysis or a pre-stack time migration analysis on the amplitude data.

For example, in step 4 of the exemplified method of FIG. 1, an offset weighting factor is applied to the data that were assembled in step 2. A semblance analysis is performed on the offset weighted amplitude data to generate a semblance plot, as shown is in step 6. Then, in step 17 the semblance plot is used to define the slowness limits $p_{min}$ and $p_{max}$ that will be applied to the transformation. The offset weighted data are then transformed with a high resolution hyperbolic Radon transformation according to the transform limits in step 5. It will be appreciated, however, that the Radon transformation of the offset weighted data may be may be based on linear slant stack, parabolic, or other non-hyperbolic kinematic travel time trajectories.

The slowness transformation limits $p_{min}$ and $p_{max}$ are defined by reference to the velocity function for primary reflection signals as determined, for example, through the semblance analysis described above. High and low transformation limits, i.e., a maximum velocity ($v_{max}$) and minimum velocity ($v_{min}$), are defined on either side of the velocity function. The velocity limits then are converted into slowness limits $p_{min}$ and $p_{max}$ which will limit the slowness domain for the transformation of the data from the offset-time domain to the tau-P domain, where $p_{min}=1/v_{max}$ and $p_{max}=1/v_{min}$.

In general, $p_{max}$ is greater than the slowness of reflection signals from the shallowest reflective surface of interest. In marine surveys, however, it typically is desirable to record the water bottom depth. Thus, $p_{max}$ may be somewhat greater, i.e., greater than the slowness of reflective signals through water in the area of interest. The lower transformation limit, $p_{min}$, generally is less than the slowness of reflection signals from the deepest reflective surface of interest. Typically, the upper and lower transformation limits $p_{min}$ and $p_{max}$ will be set within 20% below (for lower limits) or above (for upper limits) of the slownesses of the pertinent reflection signals, or more preferably, within 10% or 5% thereof. While the specific values will depend on the data recorded in the survey, therefore, $p_{min}$ generally will be less than about 165 μsec/m and, even more commonly, less than about 185 μsec/m. Similarly, $p_{max}$ generally will be greater than about 690 μsec/m, and even more commonly, greater than about 655 μsec/m for marine surveys. For land surveys, $p_{max}$ generally will be greater than about 3,125 μsec/m, and even more commonly, greater than about 500 μsec/m.

When the semblance analysis is performed on amplitude data that have been offset weighted, as described above, appropriate slowness limits $p_{min}$ and $p_{max}$ may be more accurately determined and, therefore, a more efficient and effective transformation may be defined. It will be appreciated, however, that the semblance analysis may be performed on data that have not been offset weighted. Significant improvements in computational efficiency still will be achieved by the subject invention.

The use and advantages of limited Radon transformations are more completely disclosed in the application of John M. Robinson, Rule 47(b) Applicant, entitled "Removal of Noise From Seismic Data Using Limited Radon Transformations", U.S. Ser. No. 10/238,212, filed Sep. 10, 2002, now U.S. Pat. No. 6,735,528, the disclosure of which is hereby incorporated by reference. It will be appreciated, however, that by limiting the transformation, novel methods usually will be made more efficient, by reducing the amount of data transformed, and more effective, by decimating the noise signals that fall outside those limits. It is not necessary, however, that effective slowness limits, either lower limits $p_{min}$ or upper limits $p_{max}$, be placed on the transformation. Significant benefits still will be obtained by practicing the subject invention as described and claimed herein.

A general mathematical formulation utilizing the offset weighting factor and encompassing the linear, parabolic, and hyperbolic forward Radon transforms is as follows:

$$u(p, \tau) = \int_{-\infty}^{\infty} dx \int_{-\infty}^{\infty} dt\, d(x, t) x^n \delta[f(t, x, \tau, p)] \quad (1)$$

(forward transformation)

where
- $u(p,\tau)$=transform coefficient at slowness p and zero-offset time
- $\tau d(x,t)$=measured seismogram at offset x and two-way time t
- $x^n$=offset weighting factor (0<n<1)
- $\delta$=Dirac delta function
- $f(t,x,\tau,p)$=forward transform function The forward transform function for hyperbolic trajectories is as follows:

$$f(t,x,\tau,p) = t - \sqrt{\tau^2 + p^2 x^2}$$

Thus, when $t = \sqrt{\tau^2 + p^2 x^2}$, the forward hyperbolic Radon transformation equation becomes $$u(p, \tau) = \int_{-\infty}^{\infty} dx\, x^n d\left(x, \sqrt{\tau^2 + p^2 x^2}\right)$$

The forward transform function for linear slant stack kinematic trajectories is as follows:

$$f(t,x,\tau,p) = t - \tau - px$$

Thus, when $t = \tau + px$, the forward linear slant stack Radon transformation equation becomes $$u(p, \tau) = \int_{-\infty}^{\infty} dx\, x^n d(x, \tau + px)$$

The forward transform function for parabolic trajectories is as follows:

$$f(t,x,\tau,p) = t - \tau - px^2$$

Thus, when $t = \tau + px^2$, the forward parabolic Radon transformation equation becomes $$u(p, \tau) = \int_{-\infty}^{\infty} dx\, x^n d(x, \tau + px^2)$$

As with conventional Radon transformations, the function $f(t,x,\tau,p)$ allows kinematic travel time trajectories to include anisotropy, P-S converted waves, wave-field separations, and other applications of current industry that are used to refine the analysis consistent with conditions present in the survey area. Although hyperbolic travel time trajectories represent more accurately reflection events for common midpoint gathers in many formations, hyperbolic Radon transformations to date have not been widely used. Together with other calculations necessary to practice prior art processes, the computational intensity of hyperbolic Radon transforms tended to make such processing more expensive and less accurate. Hyperbolic Radon transformations, however, are preferred in the context of the subject invention because the computational efficiency of the novel processes allows them to take advantage of the higher degree of accuracy provided by hyperbolic travel time trajectories.

It will be noted, however, that the novel Radon transformations set forth above in Equation 1 differ from conventional Radon transformations in the application of an offset weighting factor $x^n$, where x is offset. The offset weighting factor emphasizes amplitude differences that exist at increasing offset, i.e., normal amplitude moveout differences between desired primary reflections and multiples, linear, and other noise whose time trajectories do not fit a defined kinematic function. Since the offset is weighted by a factor n that is positive, larger offsets receive preferentially larger weights. The power n is greater than zero, but less than 1. Preferably, n is approximately 0.5 since amplitudes seem to be preserved better at that value. While the power n appears to be robust and insensitive, it probably is data dependent to some degree.

While the application of an offset weighting factor as described above is preferred, it will be appreciated that other methods of amplitude balancing may be used in the methods of the subject invention. For example, automatic gain control (AGC) operators may be applied. A gain control operator may be applied where the gain control operator is the inverse of the trace envelope for each trace as disclosed in U.S. Pat. No. 5,189,644 to Lawrence C. Wood and entitled "Removal of Amplitude Aliasing Effect From Seismic Data".

As will be appreciated by workers in the art, execution of the transformation equations discussed above involve numerous calculations and, as a practical matter, must be executed by computers if they are to be applied to the processing of data as extensive as that contained in a typical seismic survey. Accordingly, the transformation equations, which are expressed above in a continuous form, preferably are translated into discrete transformation equations which approximate the solutions provided by continuous transformation equations and can be encoded into and executed by computers.

For example, assume a seismogram d(x,t) contains 2L+1 traces each having N time samples, i.e., $l = 0, \pm 1, \ldots, \pm L$ and $k = 1, \ldots, N$ and that $x_{-L} < x_{-L+1} < \ldots < x_{L-1} < x_L$ A discrete general transform equation approximating the continuous general transform Equation 1 set forth above, therefore, may be derived as set forth below:

$$u(p, \tau) = \sum_{l=-L}^{L} \sum_{k=1}^{N} d(x_l, t_k) x_l^n \delta[f(t_k, x_l, \tau, p)] \Delta x_l \Delta t_k \tag{2}$$

where $\Delta x_l = \dfrac{x_{l+1} - x_{l-1}}{2}$ for $l = 0, \pm 1, \ldots, \pm(L-1)$ $\Delta x_L = x_L - x_{L-1}$ $\Delta x_{-L} = x_{-L+1} - x_{-L}$ $\Delta t_k = \dfrac{t_{k+1} - t_{k-1}}{2}$ for $k = 2, \ldots, N-1$ $\Delta t_1 = t_2 - t_1$ $\Delta t_N = t_N - t_{N-1}$ By substituting the hyperbolic forward transform function set forth above, the discrete general forward transformation Equation 2 above, when $t = \sqrt{\tau^2 + p^2 x^2}$, may be reduced to the discrete transformation based on hyperbolic kinematic travel time trajectories that is set forth below:

$$u(p, \tau) = \sum_{l=-L}^{L} x_l^n d\left(x_l, \sqrt{\tau^2 + p^2 x_l^2}\right) \Delta x_l$$

Similarly, when $t=\tau+px$, the discrete linear slant stack forward transformation derived from general Equation 2 is as follows:

$$u(p, \tau) = \sum_{l=-L}^{L} x_l^n d(x_l, \tau + px_l) \Delta x_l$$

When $t=\tau+px^2$, the discrete parabolic forward transformation is as follows:

$$u(p, \tau) = \sum_{l=-L}^{L} x_l^n d(x_l, \tau + px_l^2) \Delta x_l$$

Those skilled in the art will appreciate that the foregoing discrete transformation Equation 2 sufficiently approximates continuous Equation 1, but still may be executed by computers in a relatively efficient manner. For that reason, the foregoing equation and the specific cases derived therefrom are preferred, but it is believed that other discrete transformation equations based on Radon transformations are known, and still others may be devised by workers of ordinary skill for use in the subject invention.

It will be appreciated, however, that the subject invention provides for the transformation of data with a high resolution Radon filter. That is, the transformation is performed according to an index j of the slowness set and a sampling variable $\Delta p$, wherein $$j = \frac{p_{max} - p_{min} + 1 \; \mu sec/m}{\Delta p},$$

$p_{max}$ is a predetermined maximum slowness, and $p_{min}$ is a predetermined minimum slowness. Thus, the novel methods provide finer resolution transformations and, therefore, better resolution in the filtered data.

More specifically, $\Delta p$ typically is from about 0.5 to about 4.0 μsec/m. $\Delta p$ preferably is from about 0.5 to about 3.0 μsec/m, and more preferably, is from about 0.5 to about 2.0 μsec/m. A $\Delta p$ of about 1.0 μsec/m is most preferably used. Slowness limits $p_{min}$ and $p_{max}$ which are used to determine the index j of the slowness set, are generally set in the same manner as the slowness limits that preferably are applied to limit the transformation as described above. That is, $p_{max}$ generally is greater than the slowness of reflection signals from the shallowest reflective surface of interest, although in marine surveys it may be somewhat greater, i.e., greater than the slowness of reflective signals through water in the area of interest, so as to record the water bottom depth. The minimum slowness limit, $p_{min}$, generally is less than the slowness of reflection signals from the deepest reflective surface of interest. Typically, the minimum and maximum limits $p_{min}$ and $p_{max}$ will be set within 20% below (for minimum limits) or above (for maximum limits) of the slownesses of the pertinent reflection signals, or more preferably, within 10% or 5% thereof. The specific values for the slowness limits $p_{min}$ and $p_{max}$ will depend on the data recorded in the survey, but typically, therefore, j preferably is from about 125 to about 1000, most preferably from about 250 to about 1000.

Such values are significantly finer than prior art Radon processes, where $\Delta p$ is typically set at values in the range of 4-24 μsec/m. Also, the index j of the slowness set usually is equal to the fold of the offset data, which typically ranges from about 20 to about 120. The novel processes, therefore, provide a much higher resolution transformation and, to that extent, increased accuracy in the filtering of the data.

It also will be appreciated that this increased resolution and accuracy may be achieved without reliance on computationally intensive processing steps, such as trace interpolation, LMS analysis in the transformation, or NMO correction of the data prior to transformation, which also requires a LMS analysis. Moreover, it is possible to avoid the loss of resolution caused by the use of coarse sampling variables in NMO correcting, i.e., $\Delta t$ values in the range of 20-40 milliseconds and $\Delta v$ values of from about 15 to about 120 m/sec.

Filtering of Data

The methods of the subject invention further comprise the step of applying a corrective filter to enhance the primary reflection signal content of the data and to eliminate unwanted noise events. Preferably, the corrective filter is a high-low filter, most preferably, a time variant, high-low filter. The corrective filter preferably is determined by performing a semblance analysis on the amplitude data to generate a semblance plot and performing a velocity analysis on the semblance plot to define a stacking velocity function and the corrective filter. The corrective filter also may be determined by performing a pre-stack time migration analysis on the amplitude data to define a velocity function and the corrective filter.

For example, in step 6 of the preferred method of FIG. 1, a semblance analysis is performed on the offset weighted amplitude data to generate a semblance plot. Then, in step 7 a velocity analysis is performed on the semblance plot to define a stacking velocity function and a time variant, high-low corrective filter. The corrective filter then is applied to the transformed data as shown in step 8.

When the semblance analysis is performed on amplitude data that have been offset weighted, as described above, the resulting velocity analysis will be more accurate and, therefore, a more effective filter may be defined. It will be appreciated, however, that the semblance analysis may be performed on data that have not been offset weighted. Significant improvements in accuracy and computational efficiency still will be achieved by the subject invention.

The high-low filter is defined by reference to the velocity function for primary reflection signals, as determined, for example, through the semblance analysis described above. The stacking velocity function, $[t_o, v_s(t_o)]$, describes the velocity of primary reflection signals as a function of $t_o$. High and low filter limits, i.e., a maximum velocity, $v_{max}(t_o)$, and a minimum velocity, $v_{min}(t_o)$, are defined on either side of the velocity function, for example, within given percentages of the velocity function. In such cases, the velocity pass region at a selected time $t_o$ corresponds to $v_s(1-r_1) \leq v \leq v_s(1+r_2)$, where $r_1$ and $r_2$ are percentages expressed as decimals. The velocity function will transform to a slowness function, $[\tau, p(\tau)]$, in the tau-P domain. Similarly, the velocity pass region will map into a slowness pass region, namely:

$$\frac{1}{v_s(1+r_2)} \leq p \leq \frac{1}{v_s(1+r_1)}$$

for application to the transformed data in the tau-P domain. The slowness limits typically are set within ±15%, preferably within ±10%, and most preferably within ±5% of the velocity function, and $r_1$ and $r_2$ may be set accordingly.

Since the velocity function for the primary reflection signals is time variant, the filter limits preferably are time variant as well. In that manner, the filter may more closely fit the reflection's velocity function and, therefore, more effectively isolate primary reflection signals and water bottom reflection signals and remove multiple reflection signals and other noise. Moreover, since the strongest noise signals typically occur at velocities slower than primary reflection signals, it is preferable that $v_{min}$ lower limit more closely approximate the velocity function of the primary reflection signals.

For such reasons and others as will be appreciated by workers in the art, time variant, high-low filters generally are more effective in removing noise and, thus, generally are preferred for use in the subject invention. The use and advantages of time variant, high low tau-P filters are more completely disclosed in the application of John M. Robinson, Rule 47(b) Applicant, entitled "Removal of Noise From Seismic Data Using Improved Tau-P Filters", U.S. Ser. No. 10/238,461, filed Sep. 10, 2002, now U.S. Pat. No. 6,721,662, the disclosure of which is hereby incorporated by reference.

Though they usually will not be as effective as when the filter limits are time variable, however, high-low filters may be used where one or both of the filter limits are is time invariant. Mute filters based on a defined $p_{mute}$ also may be used, and, if the data have been NMO corrected prior to transformation, generally will be required. Other tau-P filters are known by workers in the art and may be used.

Finally, it will be appreciated that while the subject invention contemplates the application of a filter to the transformed data in the tau-P domain, additional filters may be applied to the data in the time-space domain before or after application of the Radon transformations, or in other domains by other filtration methods, if desired or appropriate.

The design of a corrective filter is guided by the following principles. Seismic waves can be analyzed in terms of plane wave components whose arrival times in X-T space are linear. Seismic reflection times are approximately hyperbolic as a function of group offset X in the following relations:

$$t_x^2 = t_o^2 + \frac{x^2}{v_s^2}$$

where
x is the group offset,
$t_x$ is the reflection time at offset x;
$t_o$ is the reflection time at zero offset; and
$v_s$ is the stacking velocity.

The apparent surface velocity of a reflection at any given offset relates to the slope of the hyperbola at that offset. Those slopes, and thus, the apparent velocities of reflections are bounded between infinite velocity at zero offset and the stacking velocity at infinite offset. Noise components, however, range from infinite apparent velocity to about one-half the speed of sound in air.

Impulse responses for each Radon transform can be readily calculated by setting $g(t,x,\tau_1,p_1)=0$ or $f(t_1,x_1,\tau,p)=0$ in the respective domains, for example, by substituting a single point sample such as $(x_1,t_1)$ or $(\tau_1,p_1)$ in each domain. Substituting $$d(x_1,t_1)=A\delta(x-x_1)\delta(t-t_1)$$

into the linear slant stack equation yields $$u(p,\tau)=A\delta(t_1-\tau-px_1).$$

Thus it shows that a point of amplitude A at $(x_1,t_1)$ maps into the straight line $$\tau+px_1=t_1.$$

On the other hand, substituting $(p_1,\tau_1)$ of amplitude B yields $$u(p,\tau)=B\delta(\tau_1-t+p_1x)$$

showing that a point $(p_1,\tau_1)$ in tau-P space maps into the line $$\tau_1=t-p_1x.$$

In a similar manner it can be shown that a hyperbola $$t^2 = t_1^2 + \frac{x^2}{v^2}$$

maps into the point $$(\tau,p)=(t_1,1/v),$$

and vice-versa.

In the practice of the subject invention a point $(x_1,t_1)$ maps into the ellipse $$1 = \frac{\tau^2}{t_1^2} + \frac{p^2 x_1^2}{t_1^2}$$

(X-T domain impulse response) under the hyperbolic Radon transform. Thus, hyperbolas representing signals map into points.

In addition straight lines $$t=mx$$

representing organized source-generated noise also map into points $$(\tau,p)=(o,m)$$

in the tau-P domain. These properties form the basis for designing tau-P filters that pass signal and reject noise in all common geometry domains.

In summary then, in a common midpoint gather prior to NMO correction, the present invention preserves the points in tau-P space corresponding to the hyperbolas described by the stacking velocity function $(t_1,v)$, where v is the dip corrected stacking velocity. A suitable error of tolerance such as 5-20% is allowed for the stacking velocity function. Similar procedures exist for each of the other gather geometries.

The signal's characterization is defined by the Canonical equations that are used to design two and three dimensional filters in each common geometry gather. Filters designed to pass signal in the tau-P domain for the common geometry gathers for both two-and-three dimensional seismic data are derived from the following basic considerations. In the X-T domain the kinematic travel time for a primary reflection event's signal in a common midpoint ("CMP") gather is given by the previously described hyperbolic relationship $$t_x^2 = t_o^2 + \frac{x^2}{v_s^2}$$

Under the hyperbolic Radon transformation, this equation becomes $$t_x^2 = \tau^2 + p^2 x^2.$$

The source coordinate for two-dimensional seismic data may be denoted by I (Initiation) and the receiver coordinate by R (receiver) where $\tau = t_o$ and $p = 1/v_s$. The signal slowness in the tau-P domain for common source data is given by $$\left. \frac{\partial t_x}{\partial R} \right|_{I=I_o} = \frac{\partial t_x \partial C}{\partial C \partial R} + \frac{\partial t \partial x}{\partial x \partial R}$$

where the CMP coordinate (C) and offset (x) are as follows:

$$C = \frac{I + R}{2}$$

$$x = R - I$$

Defining common source slowness ($p_R$), common offset slowness ($p_C$), and common midpoint slowness ($p_x$) as follows:

$$p_R = \left. \frac{\partial t_x}{\partial R} \right|_I$$

$$p_C = \left. \frac{\partial t_x}{\partial C} \right|_x$$

$$p_x = \left. \frac{\partial t_x}{\partial x} \right|_C$$

we obtain a general (canonical) relationship for signal slowness in the tau-P domain:

$$p_R = \frac{1}{2} p_C + p_x$$

Common offset slowness $p_C$ is given by $$p_C = \frac{\partial t_x \partial t_o}{\partial t_o \partial C} = \frac{\partial t_x}{\partial t_o} p_o$$

where $p_o$ is the slowness or "dip" on the CMP section as given by $$p_o = \frac{\partial t_o}{\partial C}$$

Since $$t_x^2 = t_o^2 + \frac{x^2}{v_s^2},$$

we obtain $$\frac{\partial t_x}{\partial t_o} = \frac{t_o}{t_x} - \frac{x^2 a}{t_x v_s^3},$$

where acceleration (a)

$$a = \frac{\partial v_s}{\partial t_o}.$$

Thus, we obtain that common offset slowness ($p_C$)

$$p_C = p_o \frac{t_o}{t_x} \left( 1 - \frac{a x^2}{t_o v_s^3} \right).$$

Under a hyperbolic Radon transformation where $$\tau = t_o$$

$$t_x = \sqrt{\tau^2 + p^2 x^2},$$

we determine that the common midpoint slowness ($p_x$), common source slowness ($p_R$), common receiver slowness ($p_I$), and common offset slowness ($p_C$) may be defined as follows:

$$p_x = \frac{x}{v_s^2 \sqrt{\tau^2 + p^2 x^2}}$$

$$p_R = \frac{1}{2} p_C + p_x$$

$$p_I = \frac{1}{2} p_C - p_x$$

$$p_C = p_o \frac{\tau}{\sqrt{\tau^2 + p^2 x^2}} \left( 1 - \frac{a x^2}{t_o v_s^3} \right)$$

In common source, receiver and offset gathers, the pass regions or filters in tau-P space are defined as those slowness (p's) not exceeding specified percentages of slownesses $p_R$, $p_I$, and $p_C$, respectively:

$$p \le \left(\frac{1}{1+r_3}\right)p_R \quad \text{(common source)}$$

$$p \le \left(\frac{1}{1+r_4}\right)p_I \quad \text{(common receiver)}$$

$$p \le \left(\frac{1}{1+r_5}\right)p_C \quad \text{(common offset)}$$

where $r_3$, $r_4$, and $r_5$ are percentages expressed as decimals.

Slownesses $p_R$, $p_I$, and $p_C$ are expressed, respectively, as follows:

$$p_R = \frac{1}{2}p_C + p_x \quad \text{(common source)}$$

$$p_I = \frac{1}{2}p_C - p_x \quad \text{(common receiver)}$$

$$p_C = \frac{t_o}{t_x}p_x\left(1 - \frac{ax^2}{t_o v_s^3}\right) \quad \text{(common offset)}$$

where $$p_x = \frac{x}{t_x v_s^2}$$

$$a = \frac{\partial v_s}{\partial t_o} \quad \text{(velocity acceleration)}$$

$$p_o = \frac{\partial t_o}{\partial C} \quad \text{(dip on CMP stack)}$$

$$t_X = \sqrt{t_o^2 + \frac{x^2}{v_s^2}}$$

$$\tau = t_o$$

The value for offset x in these equations is the worse case maximum offset determined by the mute function.

Inverse Transforming the Data

After the corrective filter is applied, the methods of the subject invention further comprise the steps of inverse transforming the enhanced signal content from the time-slowness domain back to the offset-time domain using an inverse Radon transformation if, as is preferable, an offset weighting factor $x^n$ was applied to the transformed data, an inverse of the offset weighting factor $p^n$ is applied to the inverse transformed data. Similarly, if other amplitude balancing operators, such as an AGC operator or an operator based on trace envelopes, were applied, an inverse of the amplitude balancing operator is applied. The signal amplitude data are thereby restored for the enhanced signal content.

For example, in step 9 of the method of FIG. 1, an inverse hyperbolic Radon transformation is used to inverse transform the enhanced signal from the time-slowness domain back to the offset-time domain. An inverse of the offset weighting factor $p^n$ then is applied to the inverse transformed data, as shown in step 10. The signal amplitude data for the enhanced signal content are thereby restored.

A general mathematical formulation utilizing the inverse offset weighting factor and encompassing the linear, parabolic, and hyperbolic inverse Radon transforms is as follows:

$$d(x,t) = \int_{-\infty}^{\infty} dp \int_{-\infty}^{\infty} d\tau p^n \rho(\tau) * u(p,\tau) \delta[g(t,x,\tau,p)] \quad \binom{\text{inverse}}{\text{transformation}} \quad (3)$$

where
  $u(p,\tau)$=transform coefficient at slowness p and zero-offset time $\tau$
  $d(x,t)$=measured seismogram at offset x and two-way time t
  p=inverse offset weighting factor (0<n<1)
  $\rho(\tau)$*=convolution of rho filter
  $\delta$=Dirac delta function
  $g(t,x,\tau,p)$=inverse transform function The inverse transform function for hyperbolic trajectories is as follows:

$$g(t,x,\tau,p)=\tau-\sqrt{t^2-p^2x^2}$$

Thus, when $\tau=\sqrt{t^2-p^2x^2}$, the inverse hyperbolic Radon transformation equation becomes $$d(x,t) = \int_{-\infty}^{\infty} dp\, p^n \rho(\tau) * u\left(p, \sqrt{t^2-p^2x^2}\right)$$

The inverse transform function for linear slant stack trajectories is as follows:

$$g(t,x,\tau,p)=\tau-t+px$$

Thus, when $\tau=t-px$, the inverse linear slant stack Radon transformation equation becomes $$d(x,t) = \int_{-\infty}^{\infty} dp\, p^n \rho(\tau) * u(p, t-px)$$

The inverse transform function for parabolic trajectories is as follows:

$$g(t,x,\tau,p)=\tau-t+px^2$$

Thus, when $\tau=t-px^2$, the inverse parabolic Radon transformation equation becomes $$d(x,t) = \int_{-\infty}^{\infty} dp\, p^n \rho(\tau) * u(p, t-px^2)$$

As with the forward transform function $f(t,x,\tau,p)$ in conventional Radon transformations, the inverse travel-time function $g(t,x,\tau,p)$ allows kinematic travel time trajectories to include anisotropy, P-S converted waves, wave-field separations, and other applications of current industry that are used to refine the analysis consistent with conditions present in the survey area. It will be noted, however, that the novel inverse Radon transformations set forth above in Equation 3 differ from conventional inverse Radon transformations in the application of an inverse offset weighting factor $p^n$, where p is slowness.

The inverse offset weighting factor restores the original amplitude data which now contain enhanced primary reflection signals and attenuated noise signals. Accordingly, smaller offsets receive preferentially larger weights since they received preferentially less weighting prior to filtering. The power n is greater than zero, but less than 1. Preferably, n is approximately 0.5 because amplitudes seem to be preserved better at that value. While the power n appears to be robust and insensitive, it probably is data dependent to some degree.

As discussed above relative to the forward transformations, the continuous inverse transformations set forth above preferably are translated into discrete transformation equations which approximate the solutions provided by continuous transformation equations and can be encoded into and executed by computers.

For example, assume a transform coefficient $u(p,\tau)$ contains $2J+1$ discrete values of the parameter p and M discrete values of the parameter $\tau$, i.e., $$j=0, \pm 1, \ldots, \pm J \text{ and}$$

$$m=1, \ldots, M$$

and that $$p_{-J} < p_{-J+1} < \ldots < p_{J-1} < p_J$$

A discrete general transform equation approximating the continuous general transform Equation 3 set forth above, therefore, may be derived as set forth below:

$$d(x, t) = \sum_{j=-J}^{J} \sum_{m=1}^{M} u(p_j, \tau_m) p_j^n \rho(\tau) * \delta[g(t, x, \tau_m, p_j)] \Delta p_j \Delta \tau_m \quad (4)$$

where $$\Delta p_j = \frac{p_{j+1} - p_{j-1}}{2} \text{ for } j = 0, \pm 1, \ldots, \pm(J-1)$$

$$\Delta p_J = p_J - p_{J-1}$$

$$\Delta p_{-J} = p_{-J+1} - p_{-J}$$

$$\Delta \tau_m = \frac{\tau_{m+1} - \tau_{m-1}}{2} \text{ for } m = 2, \ldots, M-1$$

$$\Delta \tau_1 = \tau_2 - \tau_1$$

$$\Delta \tau_M = \tau_M - \tau_{M-1}$$

By substituting the hyperbolic inverse transform function set forth above, the discrete general inverse transformation Equation 4 above, when $\tau=\sqrt{t^2-p^2x^2}$, may be reduced to the discrete inverse transformation based on hyperbolic kinematic travel time trajectories that is set forth below:

$$d(x, t) = \sum_{j=-J}^{J} p_j^n \rho(\tau) * u\left(p_j, \sqrt{t^2 - p_j^2 x^2}\right) \Delta p_j$$

Similarly, when $\tau=t-px$, the discrete linear slant stack inverse transformation derived from the general Equation 4 is as follows:

$$d(x, t) = \sum_{j=-J}^{J} p_j^n \rho(\tau) * u(p_j, t - p_j x) \Delta p_j$$

When $\tau=t-px^2$, the discrete parabolic inverse transformation is as follows:

$$d(x, t) = \sum_{j=-J}^{J} p_j^n \rho(\tau) * u(p_j, t - p_j x^2) \Delta p_j$$

Those skilled in the art will appreciate that the foregoing inverse transformation Equations 3 and 4 are not exact inverses of the forward transformation Equations 1 and 2. They are sufficiently accurate, however, and as compared to more exact inverse equations, they are less complicated and involve fewer mathematical computations. For example, more precise inverse transformations could be formulated with Fourier transform equations, but such equations require an extremely large number of computations to execute. For that reason, the foregoing equations are preferred, but it is believed that other inverse transformation equations are known, and still others may be devised by workers of ordinary skill for use in the subject invention.

The transformations and semblance analyses described above, as will be appreciated by those skilled in the art, are performed by sampling the data according to sampling variables $\Delta t$, $\Delta x$, $\Delta \tau$, and $\Delta p$. Because the novel methods do not require NMO correction prior to transformation or a least mean square analysis, sampling variables may be much finer. Specifically, $\Delta t$ and $\Delta \tau$ may be set as low as the sampling rate at which the data were collected, which is typically 1 to 4 milliseconds, or even lower if lower sampling rates are used. $\Delta p$ values as small as about 0.5 µsec/m may be used. Preferably, $\Delta p$ is from about 0.5 to 4.0 µsec/m, more preferably from about 0.5 to about 3.0 µsec/m, and even more preferably from about 0.5 to about 2.0 µsec/m. Most preferably $\Delta p$ is set at 1.0 µsec/m. Since the sampling variables are finer, the calculations are more precise. It is preferred, therefore, that the sampling variables $\Delta t$, $\Delta x$, and $\Delta \tau$ be set at the corresponding sampling rates for the seismic data field records and that $\Delta p$ be set at 1 µsec/m. In that manner, all of the data recorded by the receivers is processed. It also is not necessary to interpolate between measured offsets.

Moreover, the increase in accuracy achieved by using finer sampling variables in the novel processes is possible without a significant increase in computation time or resources. Although the novel transformation equations and offset weighting factors may be operating on a larger number of data points, those operations require fewer computations that prior art process. On the other hand, coarser sampling variables more typical of prior art processes may be used in the novel process, and they will yield accuracy comparable to that of the prior art, but with significantly less computational time and resources.

For example, industry commonly utilizes a process known as constant velocity stack (CVS) panels that in some respects is similar to processes of the subject invention. CVS panels and the subject invention both are implemented on common mid-point gathers prior to common mid-point stacking and before NMO correction. Thus, the starting point of both processes is the same.

In the processes of the subject invention, the discrete hyperbolic radon transform u(p,τ) is calculated by summing seismic trace amplitudes d(x,t) along a hyperbolic trajectory $$t=\sqrt{\tau+p^2x^2}$$

in offset-time (x,t) space for a particular tau-p (τ,p) parameter selection. Amplitudes d(x,t) are weighted according to a power n of the offset x, i.e., by the offset weighting factor $x^n$. The summation and weighting process is described by the discrete forward transform Equation 2. In comparison, a CVS panel does not apply any offset dependent weighting.

In the processes of the subject invention, the calculation consists of first scanning over all desired zero-offset times r for a given specification of p, and then changing the value of p and repeating the x-t summation for all desired taus (τ's). Thus, all desired values of τ and p are accounted for in the summations described by Equation 2 above.

A given choice of p describes a family of hyperbolas over the common midpoint gather's x-t space. A fixed value of p is equivalent to fixing the stacking velocity $V_s$ since p is defined as its reciprocal, viz., $p=1/V_s$. By varying the zero-offset time T over the desired τ-scan range for a fixed value of $p=1/V_s$, seismic amplitudes are summed in x-t space over a family of constant velocity hyperbolic trajectories. Thus, the novel Radon transforms u(p,τ) can be thought of as successively summing amplitudes over constant velocity hyperbolic time trajectories that have not been NMO corrected.

In constructing a CVS panel the starting point is a common midpoint gather. As in the case of the novel processes, successive scans over stacking velocity $V_s$ and zero-offset time $T_o$ are implemented for hyperbolic trajectories defined by the equation $$t = \sqrt{T_o^2 + \frac{x^2}{v_s^2}}$$

The equivalence of $T_o=\tau$ and $p=1/V_s$ in defining the same families of hyperbolas is obvious. The difference between the novel processes and CVS is in the implementation of amplitude summations. In both cases, a $V_s=1/p$ is first held constant, and the $T_o=\tau$ is varied. A new $V_s=1/p$ is then held constant, and the $T_o=\tau$ scan repeated. In this manner, the same families of hyperbolas are defined. However, an NMO correction is applied to all the hyperbolas defined by the $V_s=1/p$ choice prior to summing amplitudes. A CVS trace is calculated for each constant velocity iteration by first NMO correcting the traces in the common midpoint gather and then stacking (i.e., summing) the NMO corrected traces. Thus, one CVS trace in a CVS panel is almost identical to a u(p=constant,τ) trace in the novel processes. The difference lies in whether amplitudes are summed along hyperbolic trajectories without an NMO correction as in the novel process or summed (stacked) after NMO correction.

The novel processes and CVS differ in the interpolations required to estimate seismic amplitudes lying between sample values. In the novel processes amplitude interpolations occur along hyperbolic trajectories that have not been NMO corrected. In the CVS procedure amplitude interpolation is an inherent part of the NMO correction step. The novel processes and CVS both sum over offset x and time t after interpolation to produce a time trace where $p=1/V_s$ is held constant over time $T_o=\tau$. Assuming interpolation procedures are equivalent or very close, then a single CVS time trace computed from a particular common midpoint gather with a constant $V_s=1/p$ is equivalent in the novel processes to a time trace u(p,τ) where $p=1/V_s$ is held constant. Thus, in actual practice the velocity ensemble of CVS traces for a single common midpoint gather corresponds to a coarsely sampled transformation of the same common midpoint gather according to the novel processes. As noted, however, the novel processes are capable of using finer sampling variables and thereby of providing greater accuracy.

Refining of the Stacking Velocity Function

The subject invention also encompasses improved methods for determining a stacking velocity function which may be used in processing seismic data. Such improved methods comprise the steps of performing a semblance analysis on the restored data to generate a second semblance plot. Though not essential, preferably an offset weighting factor $x^n$, where 0<n<1, is first applied to the restored data. A velocity analysis is then performed on the second semblance plot to define a second stacking velocity function. It will be appreciated that this second stacking velocity, because it has been determined based on data processed in accordance with the subject invention, more accurately reflects the true stacking velocity function and, therefore, that inferred depths and compositions of geological formations and any other subsequent processing of the data that utilizes a stacking velocity function are more accurately determined.

For example, as shown in step 11 of FIG. 1, an offset weighting factor $x^n$ is applied to the data that were restored in step 10. A semblance plot is then generated from the offset weighted data as shown in step 12. The semblance plot is used to determine a stacking velocity function in step 13 which then can be used in further processing as in step 14. Though not shown on FIG. 1, it will be appreciated that the semblance analysis can be performed on the inverse transformed data from step 9, thereby effectively applying an offset weighting factor since the effect of offset weighting the data prior to transformation has not been inversed.

Display and Further Processing of Data

After the data are restored, they may be displayed for analysis, for example, as shown in step 15 of FIG. 1. The restored data, as discussed above, may be used to more accurately define a stacking velocity function. It also may subject to further processing before analysis as shown in step 16. Such processes may include pre-stack time or depth migration, frequency-wave number filtering, other amplitude balancing methods, removal of aliasing effects, seismic attribute analysis, spiking deconvolution, data stack processing, and other methods known to workers in the art. The appropriateness of such further processing will depend on various geologic, geophysical, and other conditions well known to workers in the art.

Invariably, however, the data in the gather, after they have been processed and filtered in accordance with the subject invention, will be stacked together with other data gathers in the survey that have been similarly processed and filtered. The stacked data are then used to make inference about the subsurface geology in the survey area.

The methods of the subject invention preferably are implemented by computers and other conventional data processing equipment. Suitable software for doing so may be written in accordance with the disclosure herein. Such software also may be designed to process the data by additional methods outside the scope of, but complimentary to the novel methods. Accordingly, it will be appreciated that suitable software will include a multitude of discrete commands and operations that may combine or overlap with the steps as described herein. Thus, the precise structure or logic of the software may be varied considerably while still executing the novel processes.

EXAMPLES

The invention and its advantages may be further understood by reference to the following examples. It will be appreciated, however, that the invention is not limited thereto.

Example 1

Model Data

Figure 4:
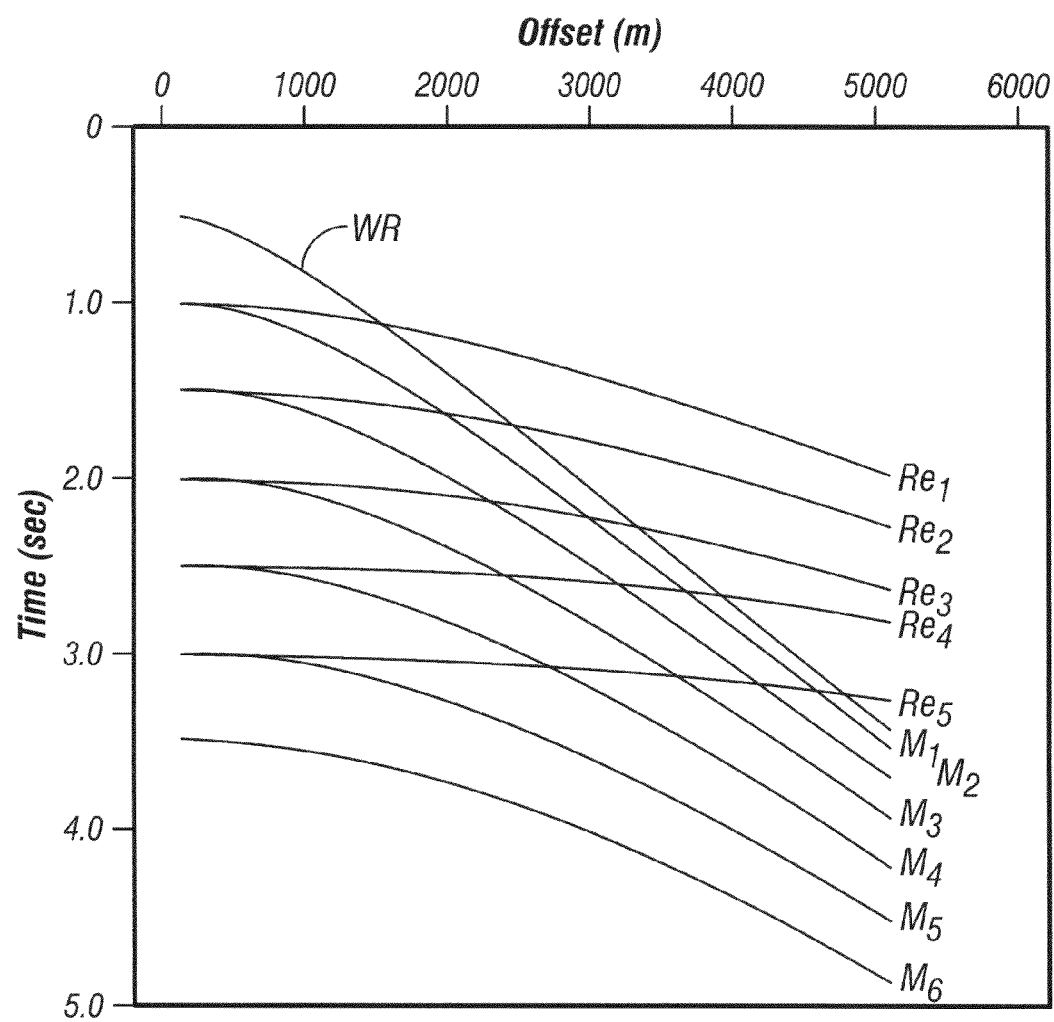
FIG. 4 is a plot or display of model seismic data in the offset-time domain of a common midpoint gather containing overlapping primary reflections, a water-bottom reflection, and undesired multiple reflections.

Seismic data were modeled in accordance with conventional considerations and plotted in the offset-time domain as shown in FIG. 4. Such data display a common midpoint gather which includes desired primary reflections $Re_n$ and undesired multiples reflections $M_n$ beginning at 1.0, 1.5, 2.0, 2.5, 3.0 and 3.5 seconds. It also includes a desired water-bottom reflection WR at 0.5 seconds. It will be noted in particular that the signals for the desired reflections $Re_n$ and WR overlap with those of the undesired multiple reflections $M_n$.

Figure 5:
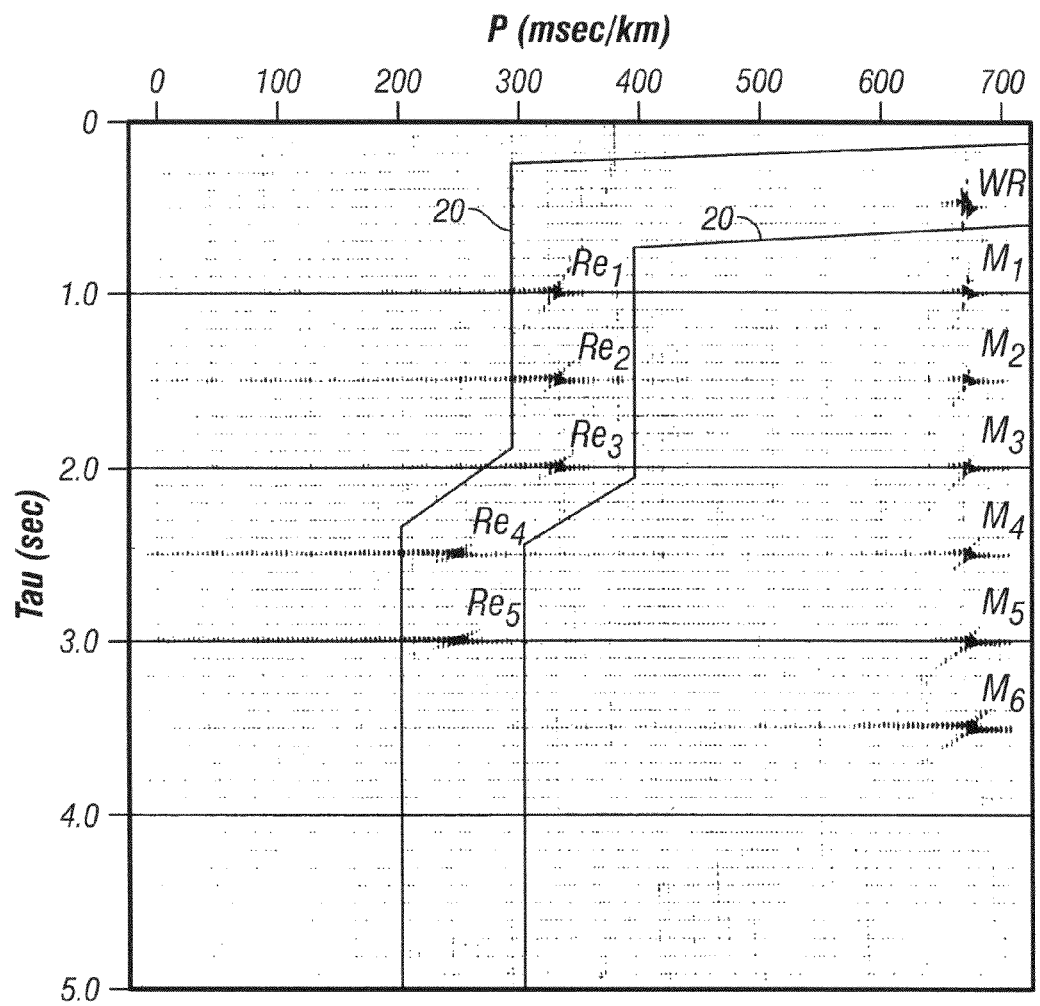
FIG. 5 is a plot of the model seismic data of FIG. 4 after transformation to the time-slowness domain using a novel high resolution, hyperbolic Radon transform of the subject invention that shows the separation of primary and water-bottom reflections from multiple reflections.
Figure 6:
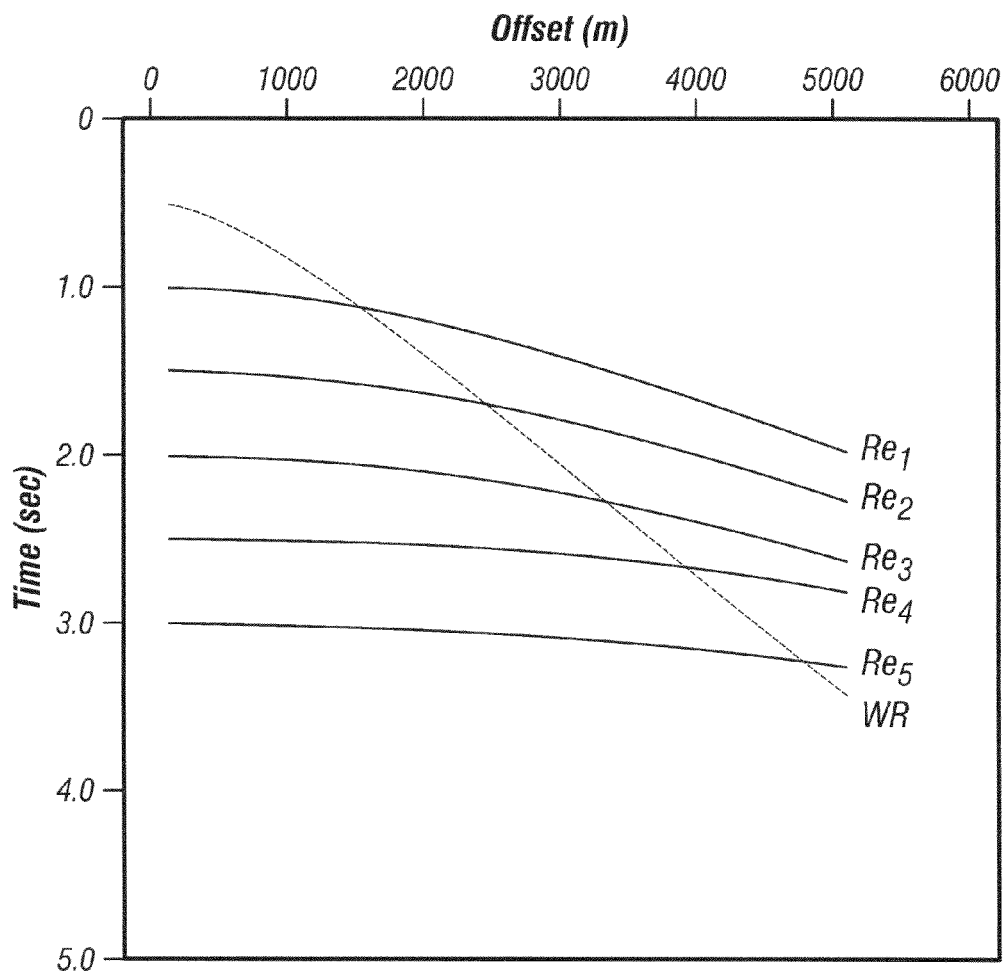
FIG. 6 is a plot or display in the offset-time domain of the model seismic data of FIG. 4 after applying a filter in the time-slowness domain and inverse transforming the filtered data that shows the retention of primary and water-bottom reflections and the elimination of multiple reflections.

The modeled seismic data were then transformed into the time-slowness domain utilizing a high resolution, hyperbolic Radon transformation of the subject invention and an offset weighting factor $x^{0.5}$. As shown in FIG. 5, the reflections $Re_n$, WR, and $M_n$ all map to concentrated point-like clusters in time-slowness space. Those points, however, map to different areas of time-slowness space, and thus, the points corresponding to undesired multiple reflections $M_n$ can be eliminated by appropriate time-slowness filters, such as the time variant, high-low slowness filter represented graphically by lines 20. Thus, when the model data are inverse transformed back to the offset-time domain by a novel hyperbolic Radon inverse transformation, as shown in FIG. 6, only the desired primary reflections $Re_n$ and the water-bottom reflection WR are retained.

Example 2

West Texas Production Area

Figure 7:
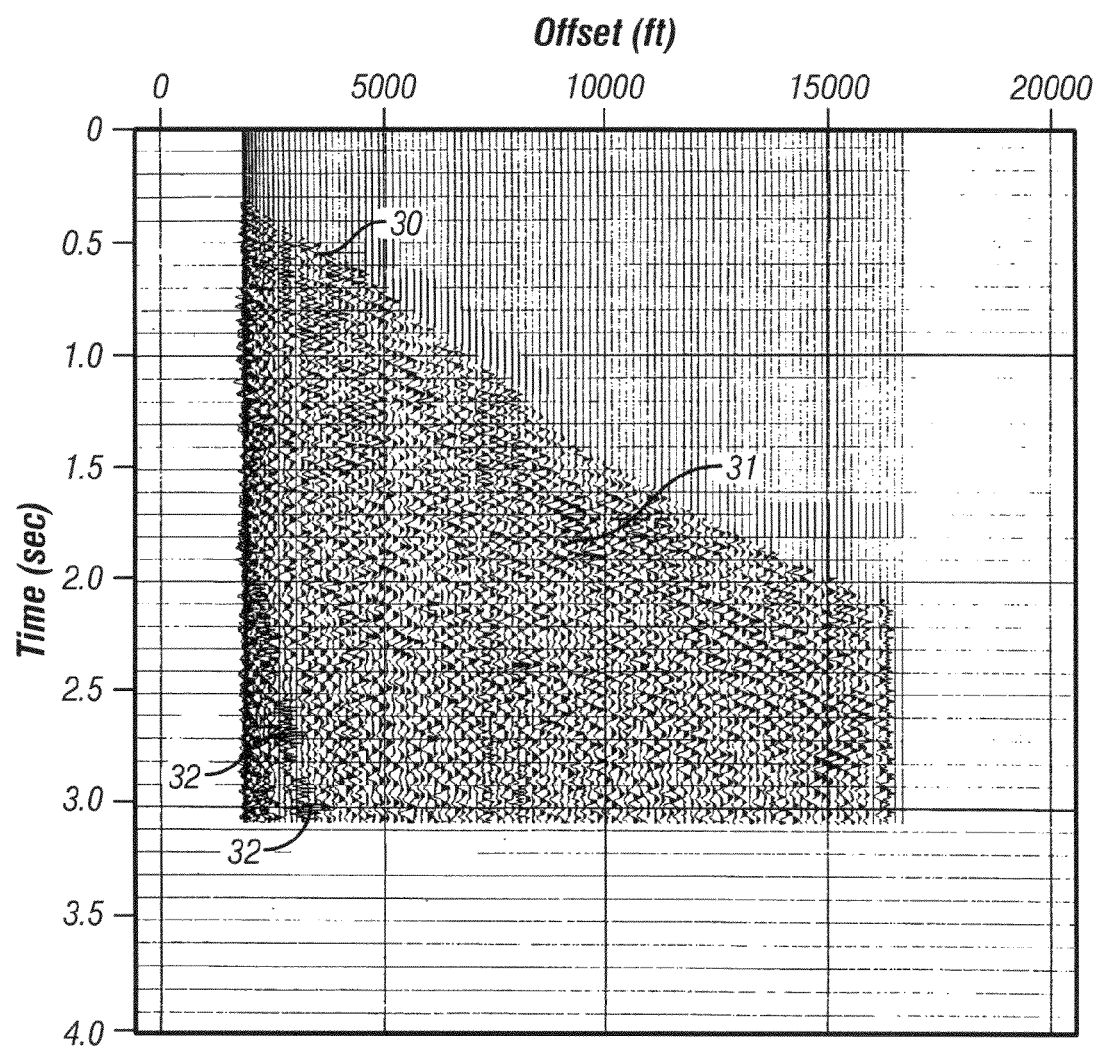
FIG. 7 is a plot in the offset-time domain of field records of seismic data recorded along a two-dimensional profile line in the West Texas region of the United States and assembled in a common midpoint geometry gather.

A seismic survey was done in the West Texas area of the United States. FIG. 7 shows a portion of the data collected along a two-dimensional survey line. It is displayed in the offset-time domain and has been gathered into a common midpoint geometry. It will be noted that the data include a significant amount of unwanted noise, including muted refractions appearing generally in an area 30, aliased ground roll occurring in area 131, and apparent air wave effects at areas 32.

In accordance with the subject invention, a conventional semblance analysis was performed on the data. The semblance plot was then used to identify a stacking velocity function and, based thereon, to define a filter that would preserve primary reflection events and eliminate noise.

The data of FIG. 7 were also transformed into the time-slowness domain with a high resolution, hyperbolic Radon transformation of the subject invention using an offset weighting factor $x^{0.5}$. A time variant, high-low filter defined through the semblance analysis was applied to the transformed data, and the data were transformed back into the offset-time domain using a hyperbolic Radon inverse transform and an inverse of the offset weighting factor $p^{0.5}$. The data then were displayed, which display is shown in FIG. 8.

Figure 8:
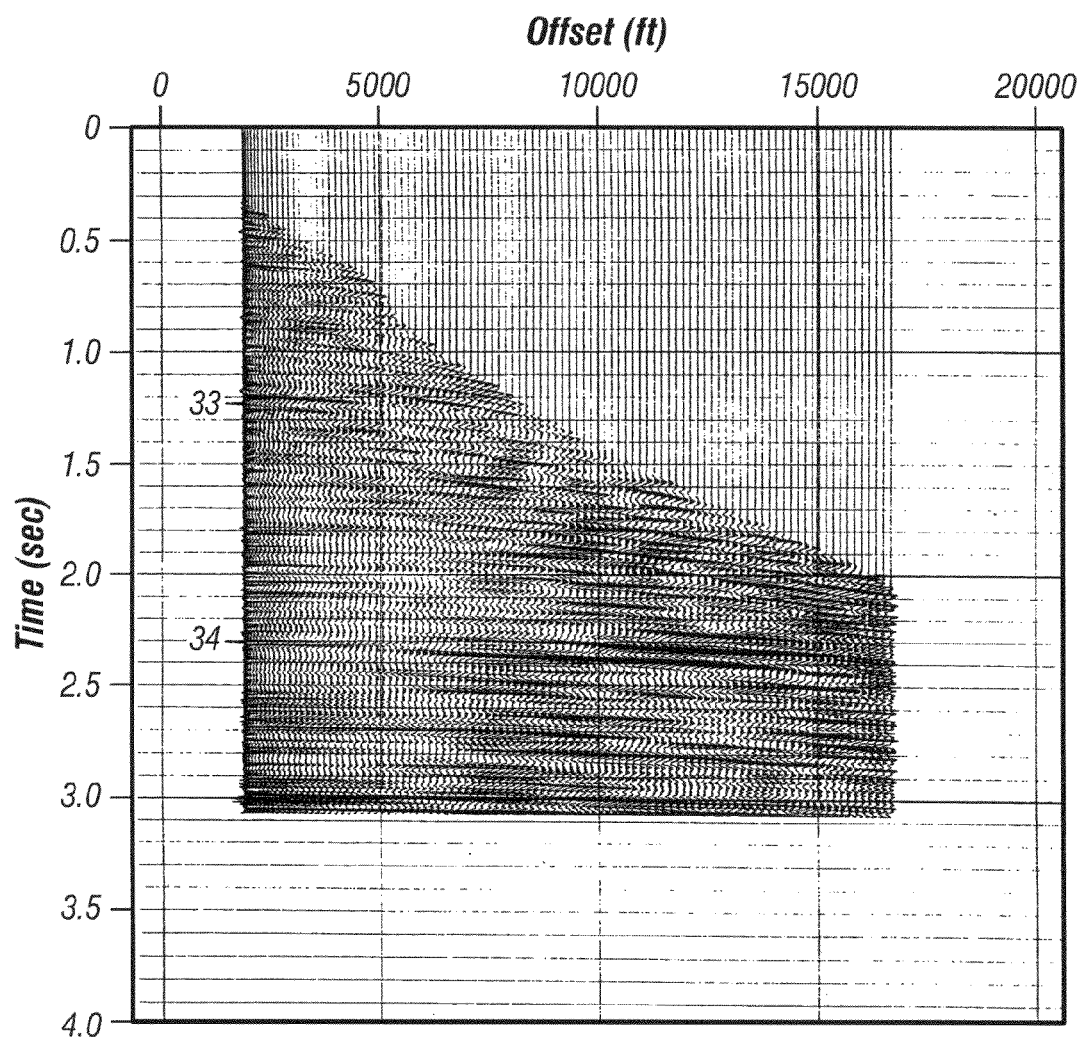
FIG. 8 is a plot in the offset-time domain of the seismic data of FIG. 7 after having been processed and filtered with a high resolution Radon transformation in accordance with the subject invention.

In FIG. 8, seismic reflection signals appear as hyperbolas, such as those indicated at 33 and 34 (troughs). It will be noted that the unwanted noise that was present in the unprocessed data of FIG. 7 as muted refractions 30, aliased ground roll 31, and air wave effects 32 is no longer present in the processed display of FIG. 8.

Figure 9:
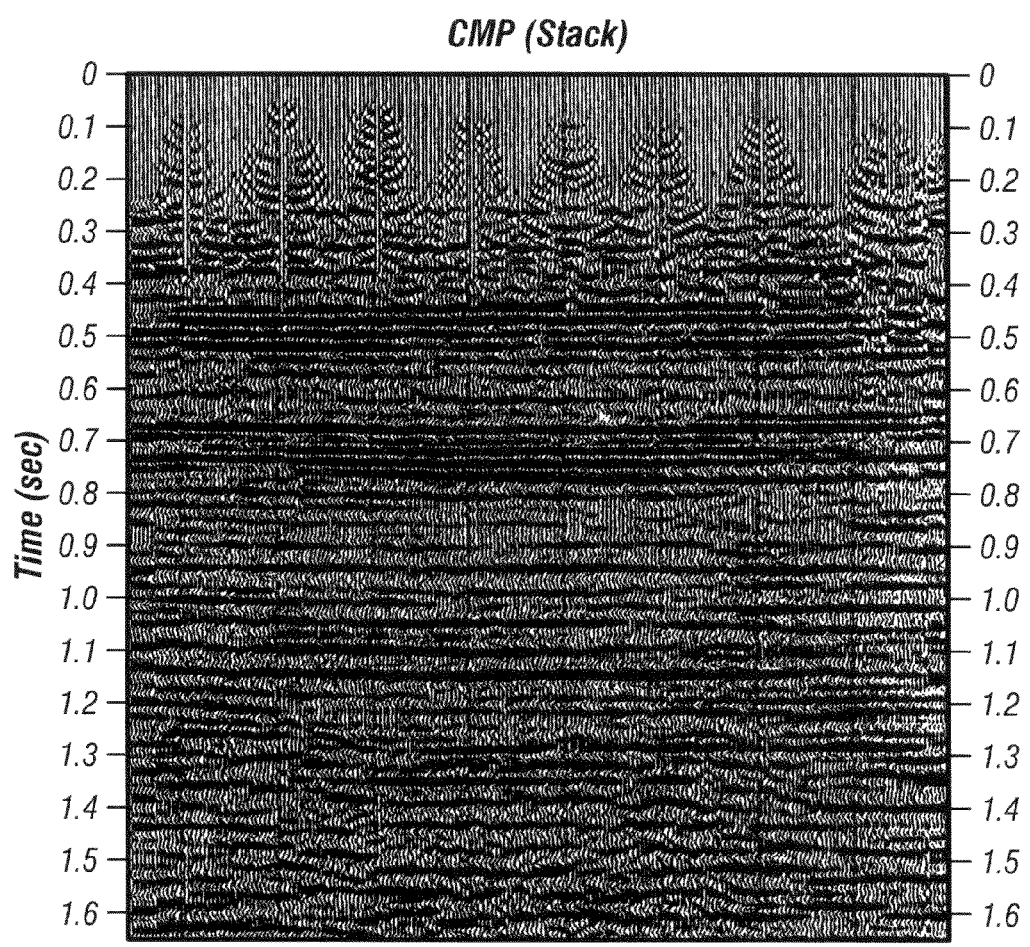
FIG. 9 is a plot in the offset-time domain of data processed and filtered with a high resolution Radon transformation according to the subject invention, including the data of FIG. 8, that have been stacked in accordance with industry practices.

The data of FIG. 8 were then stacked along with other processed and filtered CMP gathers from the survey in accordance with industry practice. A plot of the stacked data is shown in FIG. 9. Seismic reflection signals appear as horizontal lines, e.g., those lines appearing at approximately 0.45 sec and 1.12 sec, from which the depth of geological formations may be inferred.

Figure 10:
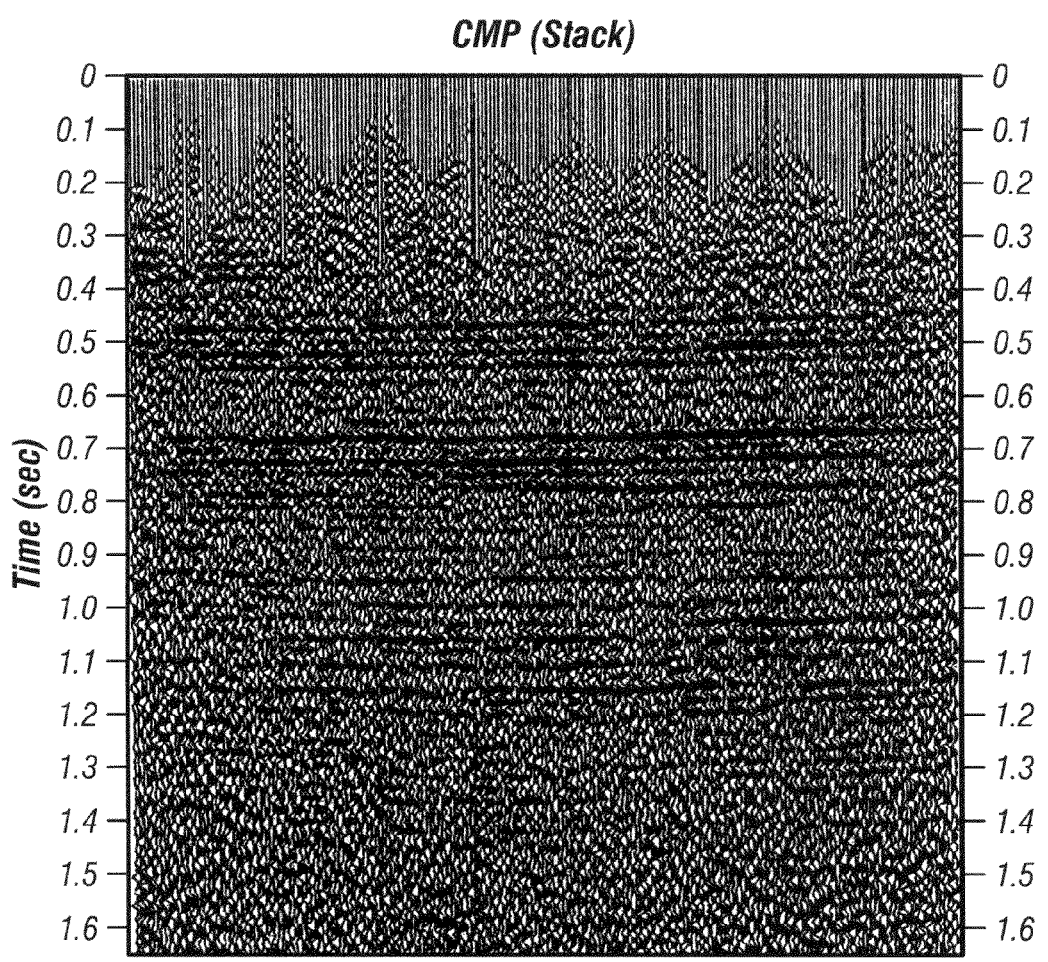
FIG. 10 (prior art) is in contrast to FIG. 9 and shows a plot in the offset-time domain of unfiltered, conventionally processed data, including the unprocessed data of FIG. 7, that have been stacked in accordance with industry practices.

By way of comparison, the data of FIG. 7, which were not subject to filtering by the subject invention, and from other CMP gathers from the survey were conventionally processed and stacked in accordance with industry practice. The unfiltered, stacked data are shown in FIG. 10. It will be appreciated therefore that the stacked filter data of FIG. 9 show reflection events with much greater clarity due to the attenuation of noise by the novel methods. For example, the reflection signals appearing at 0.45 and 1.12 sec in FIG. 9 are not clearly present in FIG. 10.

Example 3

West African Production Area

Figure 11:
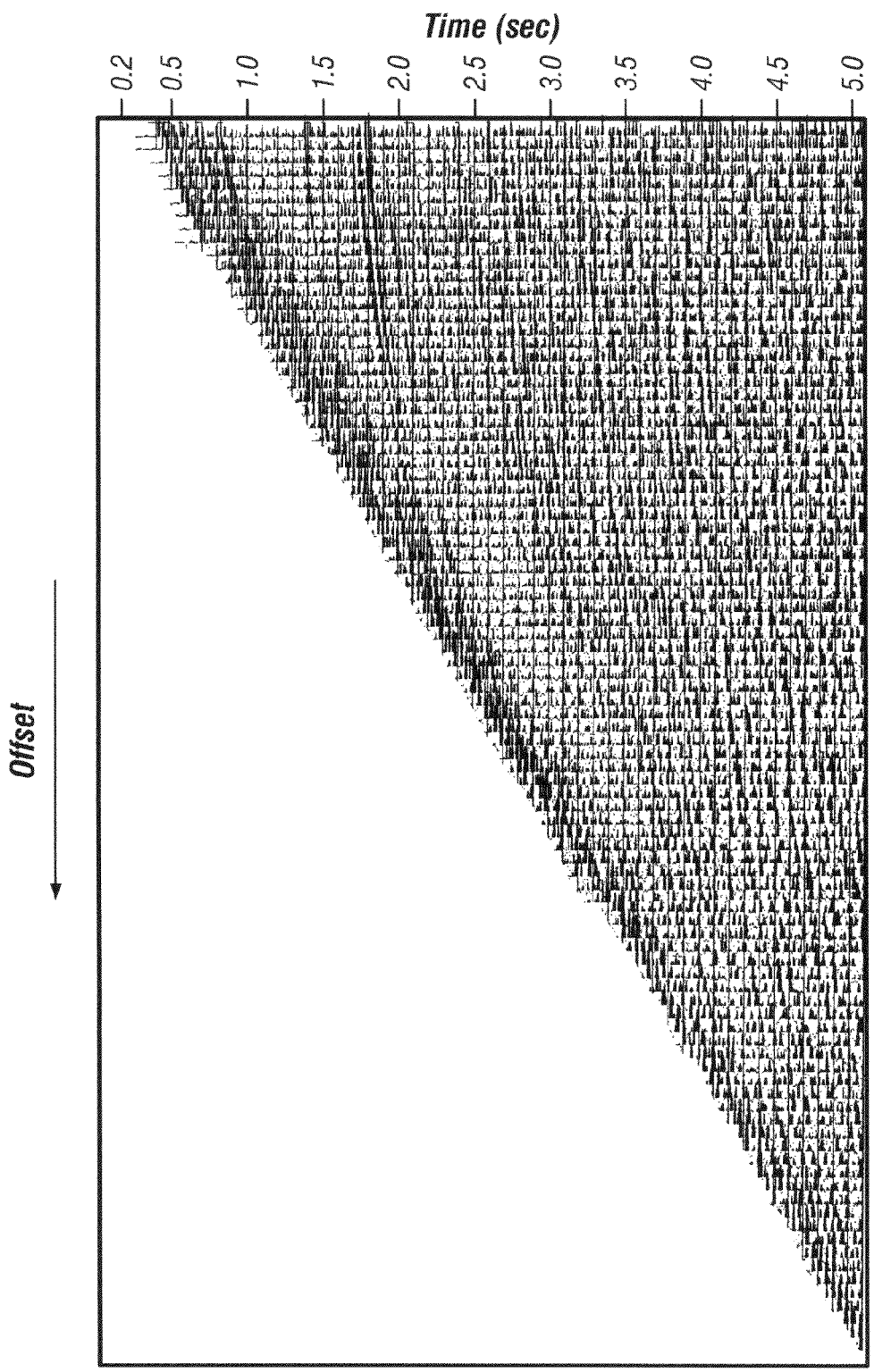
FIG. 11 is a plot in the offset-time domain of field records of seismic data recorded along a two-dimensional profile line in a West African production area and assembled in a common midpoint geometry gather.

A marine seismic survey was done in a West African offshore production area. FIG. 11 shows a portion of the data collected along a two-dimensional survey line. It is displayed in the offset-time domain and has been gathered into a common midpoint geometry. It will be noted that the data include a significant amount of unwanted noise.

Figure 12:
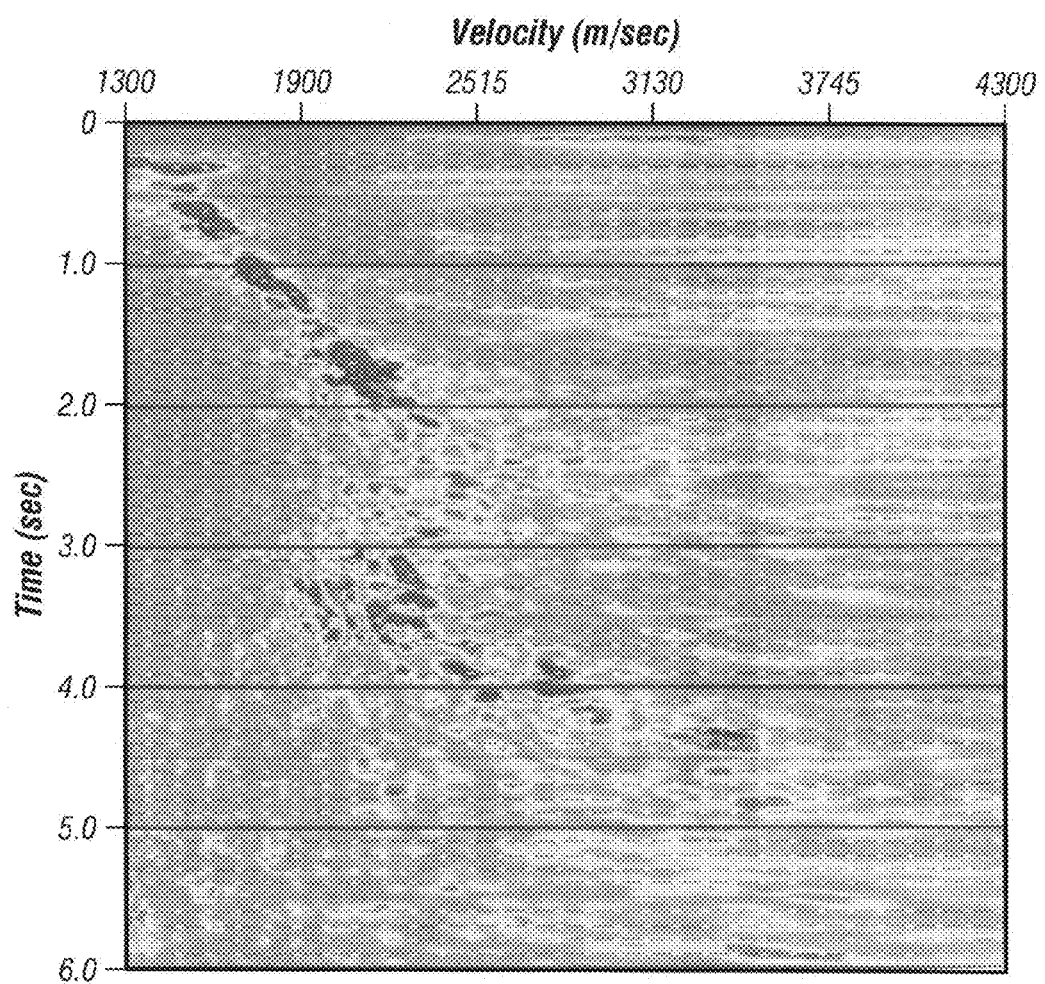
FIG. 12 is a semblance plot of the seismic data of FIG. 11.

In accordance with the subject invention, a conventional semblance analysis was performed on the data. A plot of the semblance analysis is shown in FIG. 12. This semblance plot was then used to identify a stacking velocity function and, based thereon, to define a filter that would preserve primary reflection events and eliminate noise, in particular a strong water bottom multiple present at approximately 0.44 sec in FIG. 12. The semblance analysis was also used to define lower and upper slowness limits $p_{min}$ and $p_{max}$ for transformation of the data.

The data of FIG. 11 were also transformed, in accordance with the slowness limits $p_{min}$ and $p_{max}$, into the time-slowness domain with a high resolution, hyperbolic Radon transformation of the subject invention using an offset weighting factor $x^{0.5}$. A time variant, high-low filter defined through the semblance analysis was applied to the transformed data, and the data were transformed back into the offset-time domain using a hyperbolic Radon inverse transform and an inverse of the offset weighting factor $p^{0.5}$. The data then were displayed, which display is shown in FIG. 13.

Figure 13:
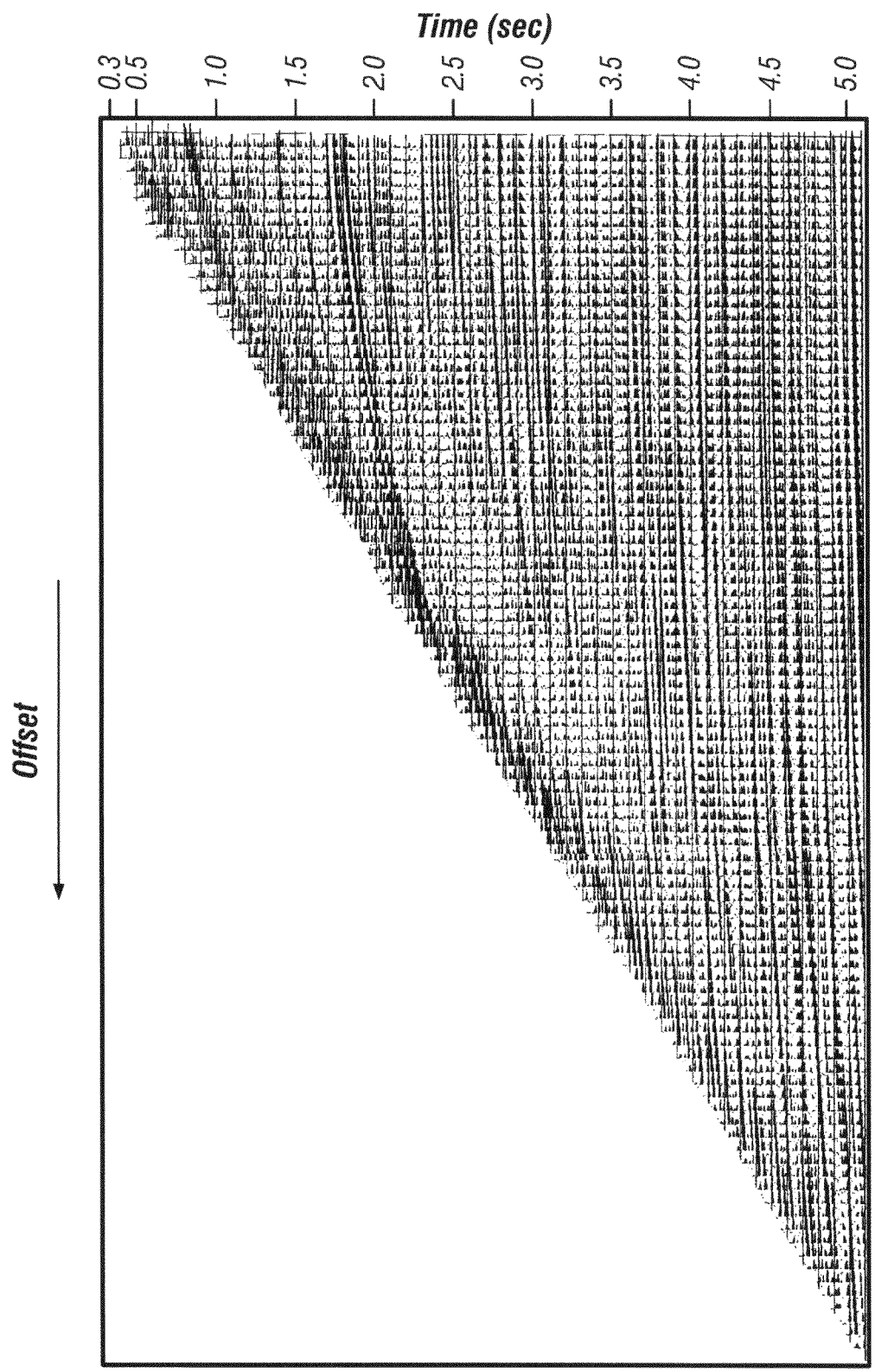
FIG. 13 is a plot in the offset-time domain of the seismic data of FIG. 11 after having been processed and filtered with a high resolution Radon transformation in accordance with the subject invention.

In FIG. 13, seismic reflection signals appear as hyperbolas, such as those starting from the near offset (right side) at approximately 1.7 sec and 2.9 sec. It will be noted that the unwanted noise that was present in the unprocessed data of FIG. 11 was severely masking the reflection hyperbolas and is no longer present in the processed display of FIG. 13.

Figure 14:
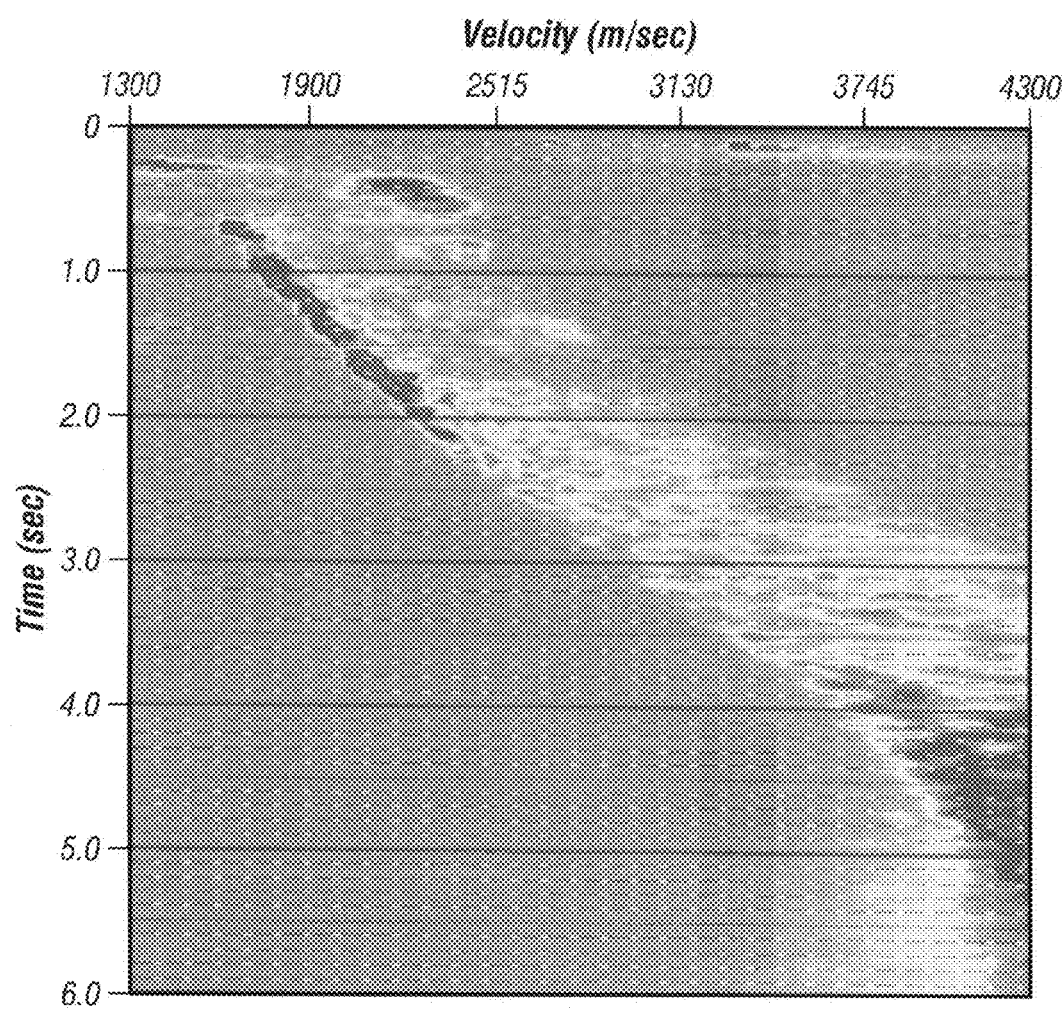
FIG. 14 is a semblance plot of the processed seismic data of FIG. 13.

The processed data of FIG. 13 then were subject to a conventional semblance analysis. A plot of the semblance analysis is shown in FIG. 14. This semblance plot was then used to identify a stacking velocity function. By comparison to FIG. 12, it will be noted that the semblance plot of FIG. 14 shows the removal of various noise events, including the strong water bottom multiple present at approximately 0.44 sec in FIG. 12. Thus, it will be appreciated that the novel processes allow for a more precise definition of the stacking velocity function which then can be used in subsequent processing of the data, for example, as described below.

Figure 15:
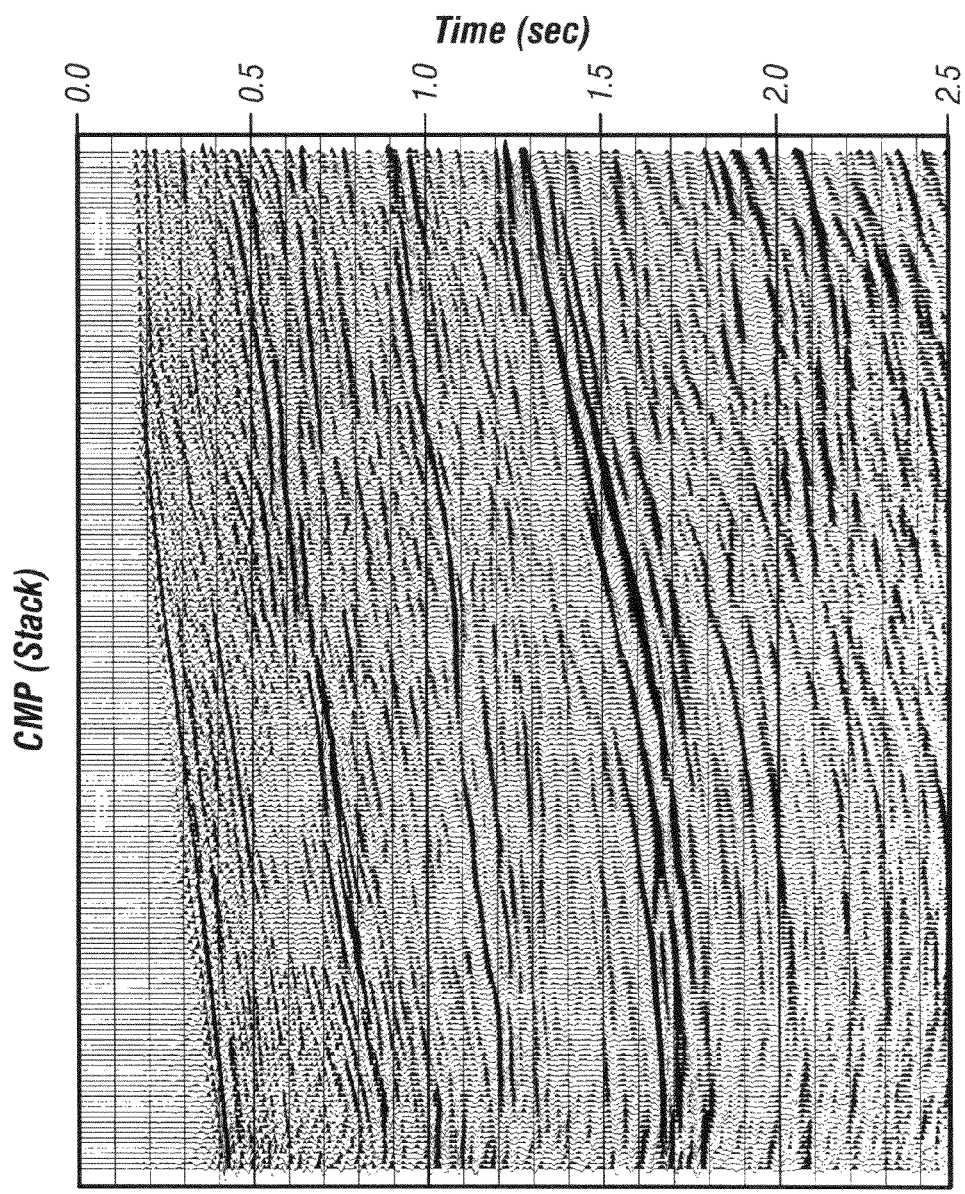
FIG. 15 is a plot in the offset-time domain of data processed and filtered with a high resolution Radon transformation according to the subject invention, including the data of FIG. 13, that have been stacked in accordance with industry practices using a stacking velocity function determined from the semblance plot of FIG. 14.

The data of FIG. 13, along with processed and filtered data from other CMP gathers in the survey, were then stacked in accordance with industry practice except that the stacking velocity function determined through the semblance plot of FIG. 14 was used. A plot of the stacked data is shown in FIG. 15. Seismic reflection signals appear as generally horizontal lines, from which the depth of geological formations may be inferred. For example, the reflective signals starting on the right side of the plot at approximately 0.41, 0.46, 1.29, and 1.34 sec. It will be noted, however, that the reflection signals in FIG. 15 slope and have slight upward curves from left to right. This indicates that the reflective formations are somewhat inclined, or what it referred to in the industry as "dip".

Figure 16:
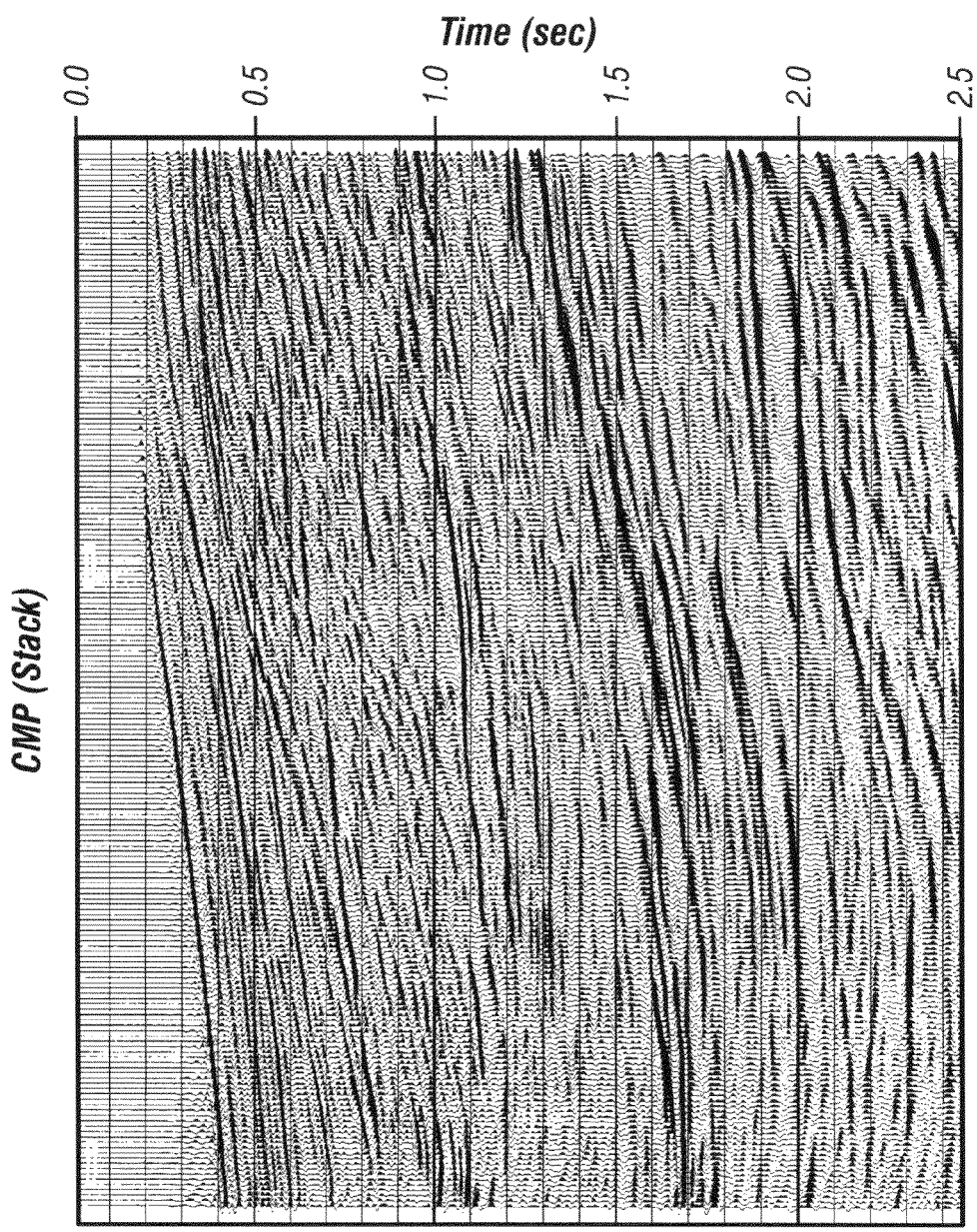
FIG. 16 (prior art) is in contrast to FIG. 15 and shows a plot in the offset-time domain of unfiltered, conventionally processed data, including the unprocessed data of FIG. 11, that have been stacked in accordance with industry practices.

By way of comparison, the unprocessed data of FIG. 11, along with data from other CMP gathers, were conventionally processed and then stacked in accordance with industry practice. The unfiltered, stacked data are shown in FIG. 16. It will be appreciated therefore that the stacked filter data of FIG. 15 show reflection events with much greater clarity due to the attenuation of noise by the novel methods. In particular, it will be noted that the reflection signals at 0.41 and 0.46 sec in FIG. 15 are not discernable in FIG. 16, and that the reflection signals at 1.29 and 1.34 sec are severely masked.

Example 4

Viosca Knoll Production Area

Figure 17:
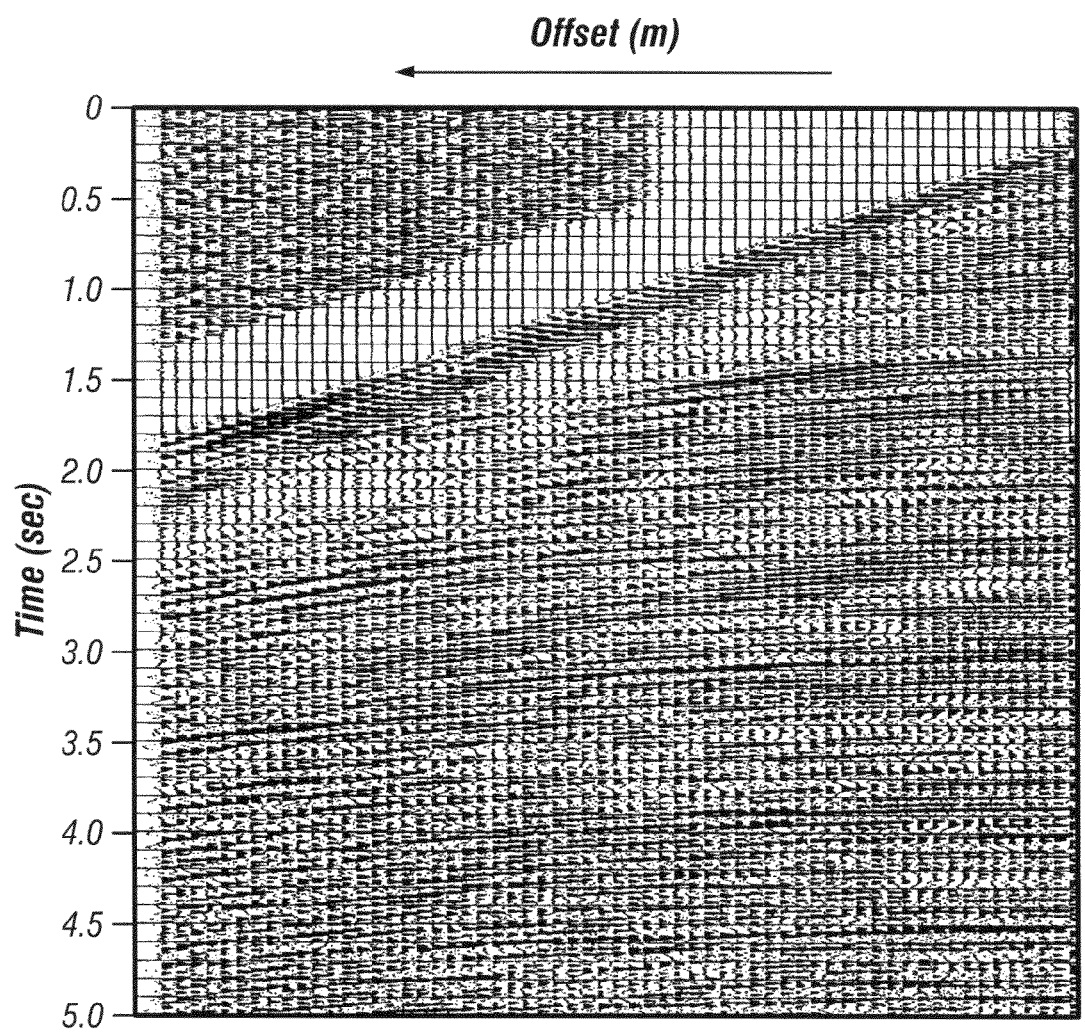
FIG. 17 is a plot in the offset-time domain of field records of seismic data recorded along a two-dimensional profile line in the Viosca Knoll region of the United States and assembled in a common midpoint geometry gather.

A marine seismic survey was done in the Viosca Knoll offshore region of the United States. FIG. 17 shows a portion of the data collected along a two-dimensional survey line. It is displayed in the offset-time domain and has been gathered into a common midpoint geometry. It will be noted that the data include a significant amount of unwanted noise, including severe multiples created by short cable acquisition.

Figure 18:
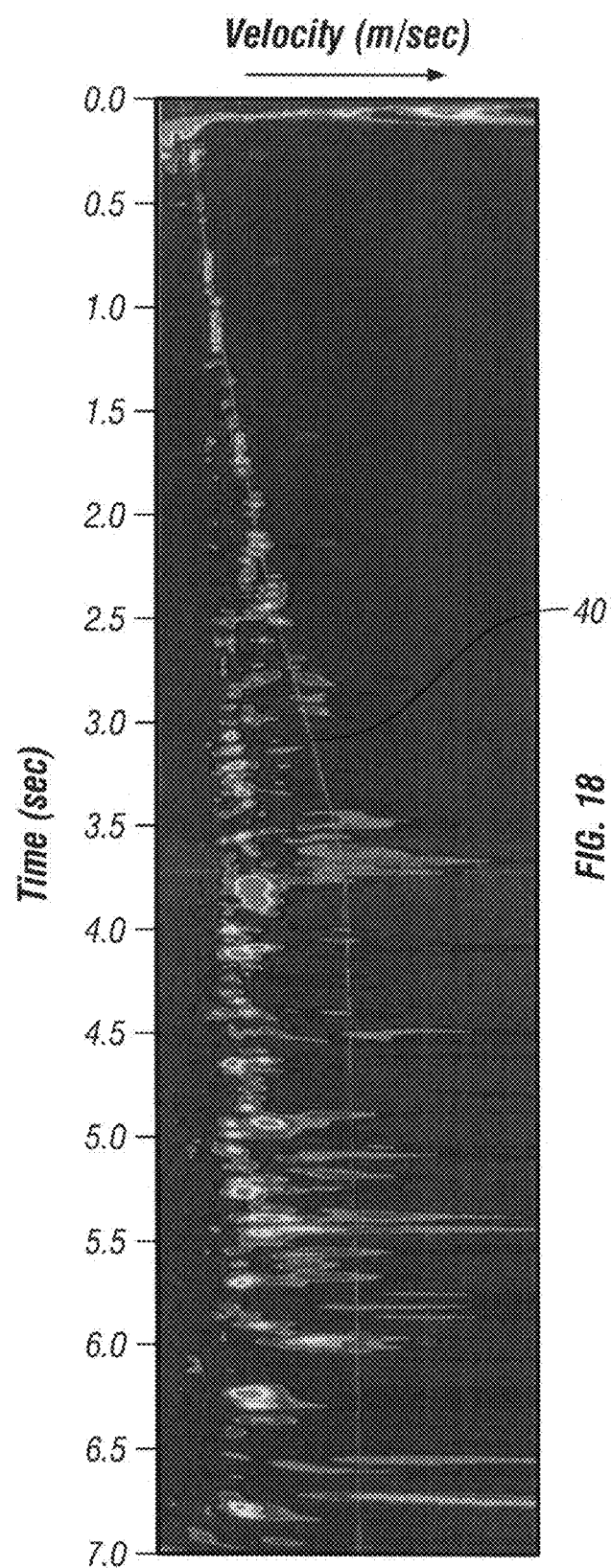
FIG. 18 is a semblance plot of the seismic data of FIG. 17.

In accordance with the subject invention, a conventional semblance analysis was applied to the data. A plot of the semblance analysis is shown in FIG. 18. This semblance plot was then used to identify a stacking velocity function and, based thereon, to define a filter that would preserve primary reflection events and eliminate noise, in particular the multiples caused by short cable acquisition that are present generally from approximately 2.5 to 7.0 sec. The stacking velocity function is represented graphically in FIG. 18 as line 40. The semblance analysis was also used to define lower and upper slowness limits $p_{min}$ and $p_{max}$ for transformation of the data.

The data of FIG. 17 were also transformed, in accordance with the slowness limits $p_{min}$ and $p_{max}$, into the time-slowness domain with a high resolution, hyperbolic Radon transformation of the subject invention using an offset weighting factor $x^{0.5}$. A time variant, high-low filter defined through the semblance analysis was applied to the transformed data, and the data were transformed back into the offset-time domain using a hyperbolic Radon inverse transform and an inverse of the offset weighting factor $p^{0.5}$. The data then were displayed, which display is shown in FIG. 19.

Figure 19:
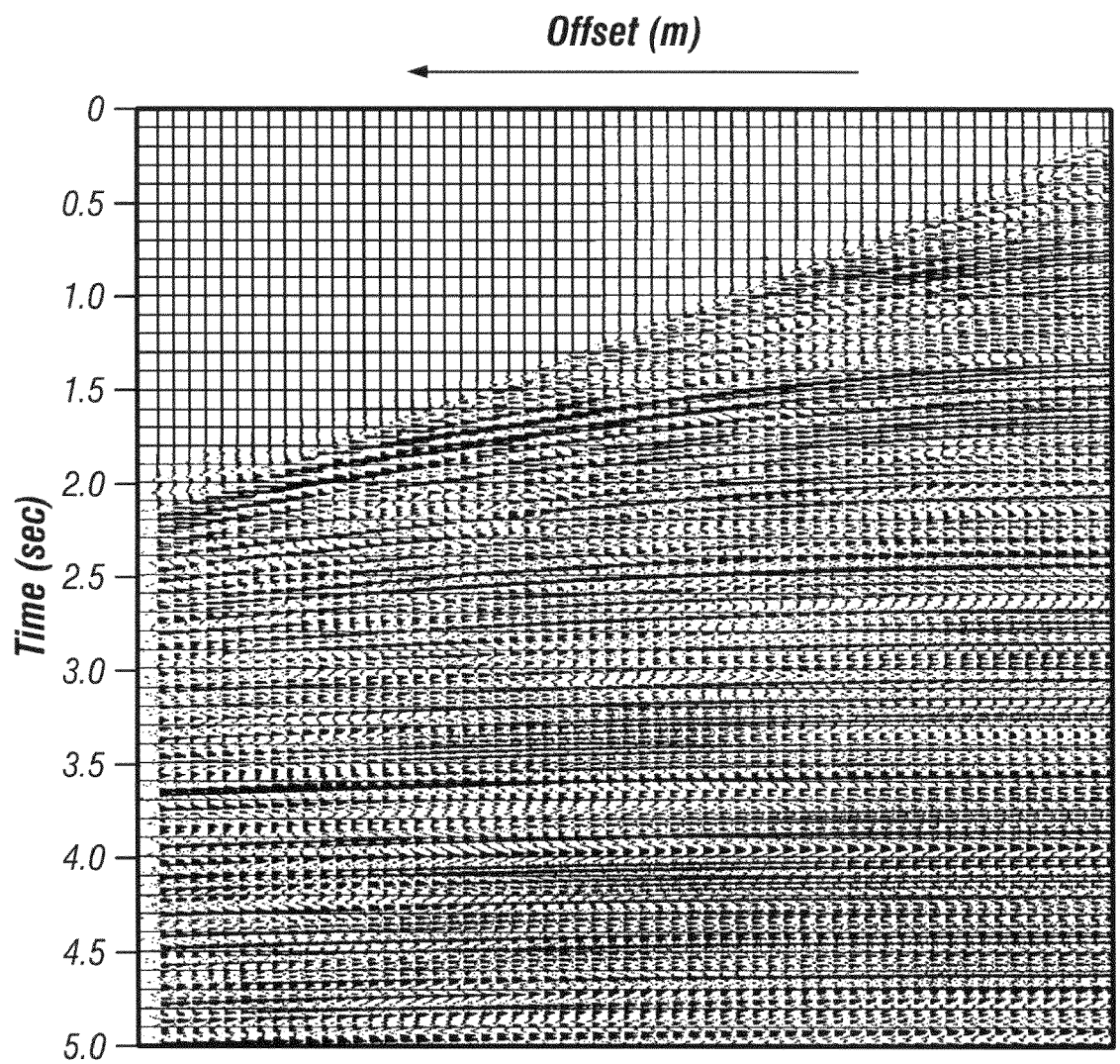
FIG. 19 is a plot in the offset-time domain of the seismic data of FIG. 17 after having been processed and filtered with a high resolution Radon transformation in accordance with the subject invention.

In FIG. 19, seismic reflection signals appear as hyperbolas, such as those beginning at the near offset (right side) below approximately 0.6 sec. It will be noted that the unwanted noise that was present in the unprocessed data of FIG. 17 below 0.6 sec and severely masking the reflection hyperbolas is no longer present in the processed display of FIG. 19. In particular, it will be noted that the reflection signals beginning at the near offset at approximately 2.0 and 2.4 sec in FIG. 19 are not discernable in the unfiltered data of FIG. 17.

Figure 20:
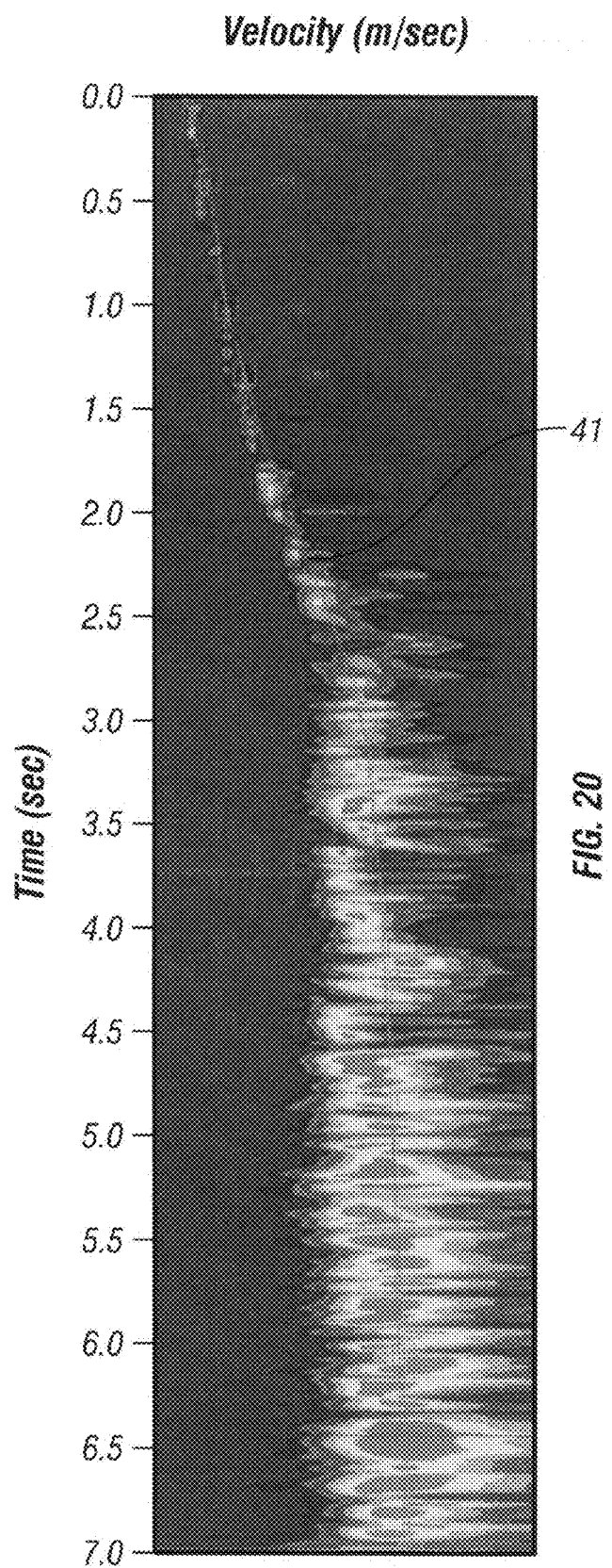
FIG. 20 is a semblance plot of the processed seismic data of FIG. 19.

The processed data of FIG. 19 then were subject to a conventional semblance analysis. A plot of the semblance analysis is shown in FIG. 20. By comparison to FIG. 118, it will be noted that the semblance plot of FIG. 20 shows the removal of various noise events, including the strong multiples located generally from 2.5 to 7.0 sec in FIG. 18 that were created by short cable acquisition. The semblance plot was then used to identify a stacking velocity function, which is represented graphically in FIG. 20 as line 41. Thus, it will be appreciated that the novel processes allow for a more precise definition of the stacking velocity function which then can be used in subsequent processing of the data, for example, as described below.

Figure 21:
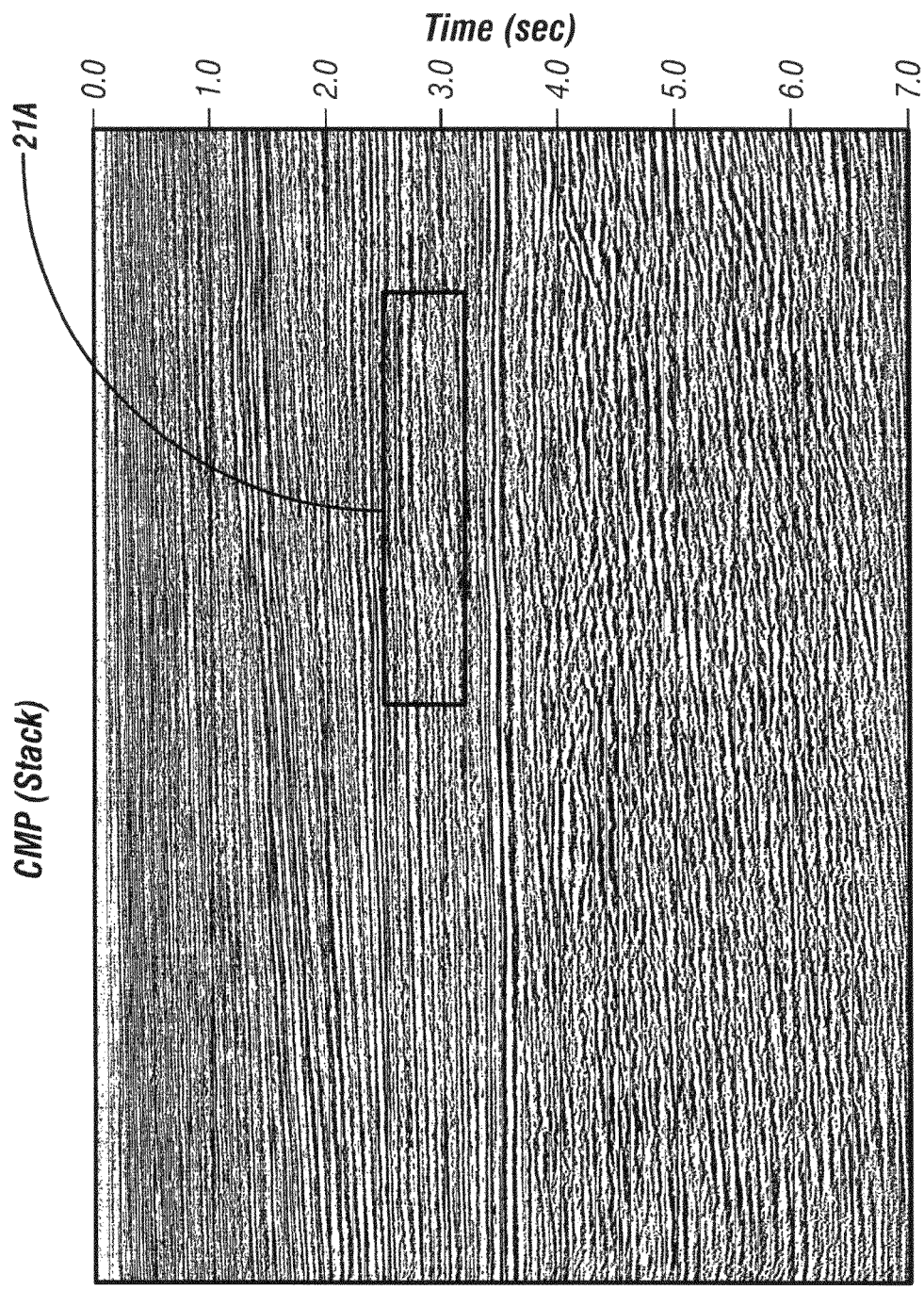
FIG. 21 is a plot in the offset-time domain of data processed and filtered with a high resolution Radon transformation according to the subject invention, including the data of FIG. 19, that have been stacked in accordance with industry practices using a stacking velocity function determined from the semblance plot of FIG. 20.

The data of FIG. 19, along with the data from other CMP gathers that had been processed and filtered with the novel methods, were then stacked in accordance with industry practice except that the stacking velocity function determined through the semblance plot of FIG. 20 was used. A plot of the stacked data is shown in FIG. 21. Seismic reflection signals appear as horizontal lines, from which the depth of geological formations may be inferred. In particular, the presence of various traps potentially holding reserves of oil or gas appear generally in areas 42, 43, 44, 45, and 46, as seen in FIG. 21A, which is an enlargement of area 21A of FIG. 21.

By way of comparison, the data of FIG. 17 and data from other CMP gathers in the survey were processed in accordance with conventional methods based on parabolic Radon transformations. In contrast to the subject invention, the data were first NMO corrected. The NMO corrected data then were transformed, without any transformation limits, to the tau-P domain using a low resolution parabolic Radon transformation that did not apply an offset weighting factor $x^n$. A conventional mute filter then was applied, and the preserved data were transformed back into the offset-time domain using a conventional parabolic Radon inverse transform that did not apply an inverse offset weighting factor $p^n$. The NMO correction was reversed to restore the preserved data, and they were subtracted from the original data in the respective gathers.

Figure 22:
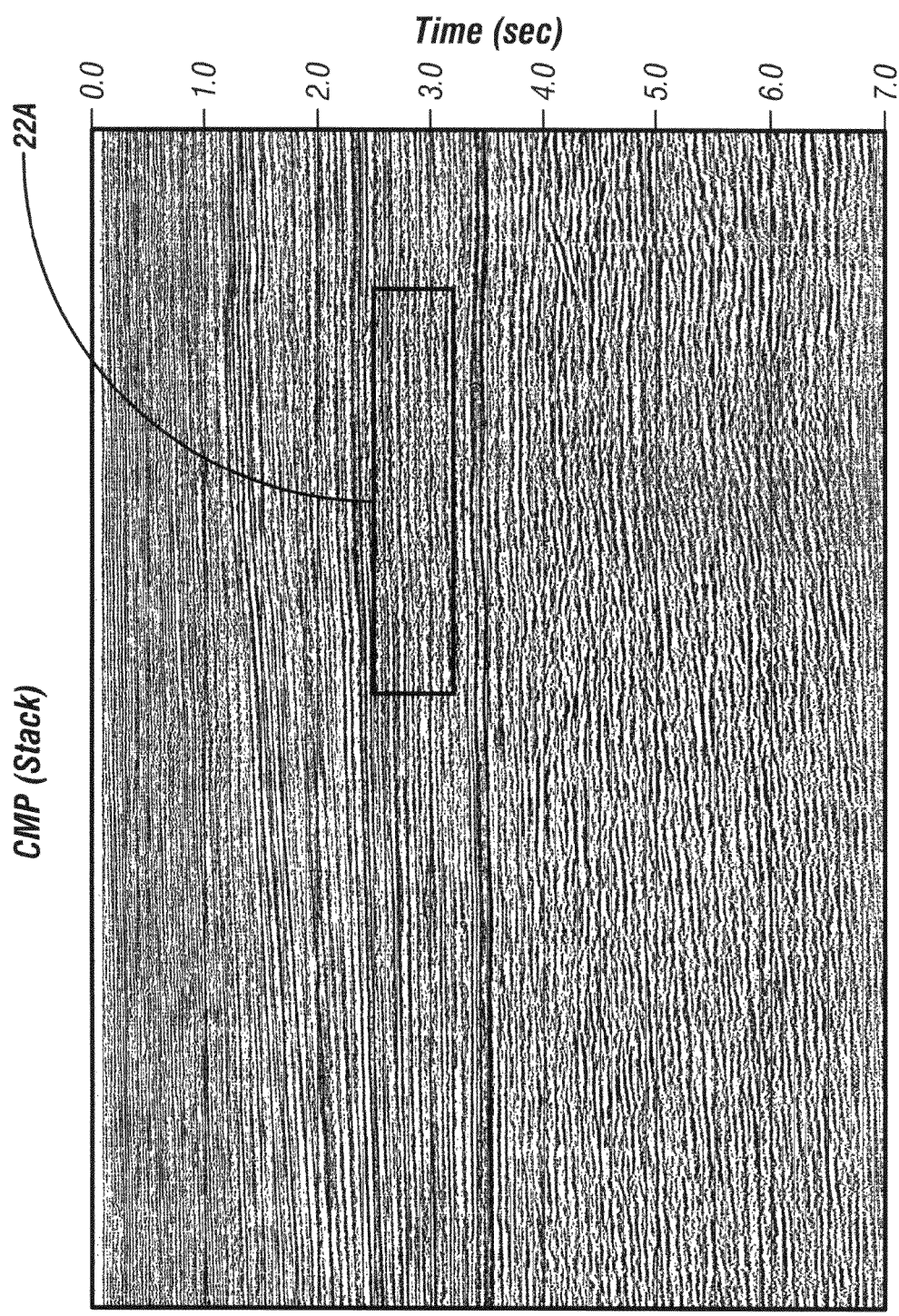
FIG. 22 (prior art) is in contrast to FIG. 21 and shows a plot in the offset-time domain of data, including the data of FIG. 17, that was processed and filtered in accordance with conventional parabolic Radon methods and then stacked in accordance with industry practices.
Figure 22A:
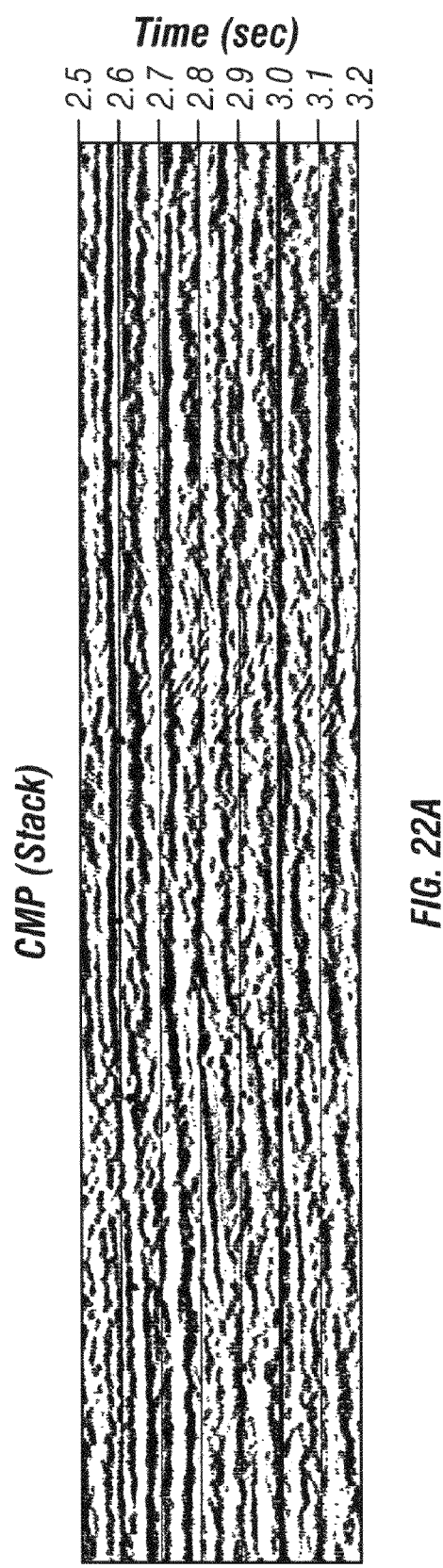
FIG. 22A (prior art) is an enlargement of the area shown in box 22A of FIG. 22.

The data that have been processed and filtered with the parabolic Radon forward and inverse transforms were then stacked in accordance with industry practice. A plot of the stacked data is shown in FIG. 22. Seismic reflection signals appear as horizontal lines, from which the depth of geological formations may be inferred. It will be noted, however, that as compared to the stacked plot of FIG. 21, reflection events are shown with much less clarity. As may best be seen in FIG. 22A, which is an enlargement of area 22A in FIG. 22, and which corresponds to the same portion of the survey profile as shown in FIG. 21A, traps 42, 43, 44, 45, and 46 are not revealed as clearly by the conventional process.

The foregoing examples demonstrate the improved attenuation of noise by the novel methods and thus, that the novel methods ultimately allow for more accurate inferences about the depth and composition of geological formations.

While this invention has been disclosed and discussed primarily in terms of specific embodiments thereof, it is not intended to be limited thereto. Other modifications and embodiments will be apparent to the worker in the art.

What is claimed is:

1. A method of processing seismic data to remove unwanted noise from meaningful reflection signals indicative of subsurface formations, wherein said seismic data comprise amplitude data recorded over time at a number of seismic receivers in an area of interest, said amplitude data are assembled into common geometry gathers in an offset-time domain, and said amplitude data comprise primary reflection signals and coherent noise that overlap in an offset-time domain; said method comprising the step of enhancing the separation between primary reflection signals and coherent noise by transforming said data from the offset-time domain to the time-slowness domain, wherein:

(a) said assembled amplitude data are transformed from the offset-time domain to the time-slowness domain using a Radon transformation according to an index j of the slowness set and a sampling variable $\Delta p$; wherein $$j = \frac{p_{max} - p_{min} + 1\mu sec/m}{\Delta p},$$

$\Delta p$ is from about 0.5 to about 4.0 μsec/m, $p_{max}$ is a predetermined maximum slowness, and $p_{min}$ is a predetermined minimum slowness;

(b) whereby said primary reflection signals and said coherent noise transform into different regions of the time-slowness domain to enhance the separation therebetween.

2. The method of claim 1, wherein said assembled amplitude data are transformed using a hyperbolic Radon transformation.

3. The method of claim 1, wherein said amplitude data are assembled into common midpoint geometry gathers.

4. The method of claim 1, wherein $\Delta p$ is from about 0.5 to 3.0 μsec/m.

5. The method of claim 1, wherein $\Delta p$ is from about 0.5 to 2.0 μsec/m.

6. The method of claim 1, wherein $\Delta p$ is about 1.0 μsec/m.

7. The method of claim 1, wherein j is from about 125 to about 1000.

8. The method of claim 1, wherein j is from about 250 to about 1000.

9. The method of claim 1, wherein $p_{max}$ is greater than the slowness of reflection signals from the shallowest reflective surface of interest, and $p_{min}$ is less than the slowness of reflection signals from the deepest reflective surface of interest.

10. The method of claim 1, wherein $p_{min}$ is less than the slowness of reflection signals from the deepest reflective surface of interest.

11. The method of claim 1, wherein said field records are obtained from a marine survey and $p_{max}$ is greater than the slowness of reflective signals through water in the area of interest.

12. The method of claim 1, wherein $p_{max}$ is greater than the slowness of reflection signals from the shallowest reflective surface of interest.

13. The method of claim 1, wherein an offset weighting factor $x^n$ is applied to said assembled amplitude data, wherein x is offset and 0<n<1.

14. The method of claim 1, wherein said Radon transformation is applied within defined slowness limits $p_{min}$ and $p_{max}$ where $p_{min}$ is a predetermined minimum slowness less than the slowness of reflection signals from the deepest reflective surface of interest and $p_{max}$ is a predetermined maximum slowness greater than the slowness of reflection signals from the shallowest reflective surface of interest.

15. The method of claim 1, wherein said assembled data are uncorrected for normal moveout.

16. The method of claim 13, wherein said assembled data are uncorrected for normal moveout.

17. The method of claim 14, wherein said assembled data are uncorrected for normal moveout.

18. A method of processing seismic data to remove unwanted noise from meaningful reflection signals indicative of subsurface formations, wherein said seismic data comprise amplitude data recorded over time at a number of seismic receivers in an area of interest, said amplitude data are assembled into common geometry gathers in an offset-time domain, and said amplitude data comprise primary reflection signals and coherent noise that overlap in an offset-time domain; said method comprising the step of enhancing the separation between primary reflection signals and coherent noise by transforming said data from the offset-time domain to the time-slowness domain, wherein:

(a) said assembled amplitude data are transformed from the offset-time domain to the time-slowness domain using a Radon transformation, wherein said Radon transformation is applied within defined slowness limits $p_{min}$ and $p_{max}$, where $p_{min}$ is a predetermined minimum slowness less than the slowness of reflection signals from the deepest reflective surface of interest and $p_{max}$ is a predetermined maximum slowness greater than the slowness of reflection signals from the shallowest reflective surface of interest;

(b) whereby said primary reflection signals and said coherent noise transform into different regions of the time-slowness domain to enhance the separation therebetween.

19. The method of claim 18, wherein said field records are obtained from a land survey and $p_{min}$ is up to 20% less than 165 μsec/m and $p_{max}$ is up to 20% greater than 3,125 μsec/m.

20. The method of claim 18, wherein said field records are obtained from a land survey and $p_{min}$ is up to 20% less than 185 μsec/m and $p_{max}$ is up to 20% greater than 500 μsec/m.

21. The method of claim 18, wherein said field records are obtained from a marine survey and $p_{min}$ is up to 20% less than 165 μsec/m and $p_{max}$ is up to 20% greater than 690 μsec/m.

22. The method of claim 18, wherein said field records are obtained from a marine survey and $p_{min}$ is up to 20% less than 185 μsec/m and $p_{max}$ is up to 20% greater than 655 μsec/m.

23. The method of claim 18, wherein $p_{min}$ is up to 20% less than the slowness of reflection signals from the deepest reflective surface of interest.

24. The method of claim 18, wherein said field records are obtained from a marine survey and $p_{max}$ is greater than the slowness of reflective signals through water in the area of interest.

25. The method of claim 18, wherein said field records are obtained from a marine survey and $p_{max}$ is up to 20% greater than the slowness of reflective signals through water in the area of interest.

26. The method of claim 18, wherein $p_{max}$ is up to 20% greater than the slowness of reflection signals from the shallowest reflective surface of interest.

27. The method of claim 18, wherein said field records are obtained from a marine survey, $p_{min}$ is up to 20% less than the slowness of reflection signals from the deepest reflective surface of interest, and $p_{max}$ is up to 20% greater than the slowness of reflective signals through water in the area of interest.

28. The method of claim 18, wherein $p_{min}$ is up to 20% less than the slowness of reflection signals from the deepest reflective surface of interest and $p_{max}$ is up to 20% greater than the slowness of reflection signals from the shallowest reflective surface of interest.

29. The method of claim 18, wherein said field records are obtained from a marine survey, $p_{min}$ is up to 20% less than the slowness of reflection signals from the deepest reflective surface of interest, and $p_{max}$ is up to 10% greater than the slowness of reflective signals through water in the area of interest.

30. The method of claim 18, wherein $p_{min}$ is up to 20% less than the slowness of reflection signals from the deepest reflective surface of interest and $p_{max}$ is up to 10% greater than the slowness of reflection signals from the shallowest reflective surface of interest.

31. The method of claim 18, wherein said field records are obtained from a marine survey, $p_{min}$ is up to 20% less than the slowness of reflection signals from the deepest reflective surface of interest, and $p_{max}$ is up to 5% greater than the slowness of reflective signals through water in the area of interest.

32. The method of claim 18, wherein $p_{min}$ is up to 20% less than the slowness of reflection signals from the deepest reflective surface of interest and $p_{max}$ is up to 5% greater than the slowness of reflection signals from the shallowest reflective surface of interest.

33. The method of claim 18, wherein said field records are obtained from a marine survey, $p_{min}$ is up to 10% less than the slowness of reflection signals from the deepest reflective surface of interest, and $p_{max}$ is up to 5% greater than the slowness of reflective signals through water in the area of interest.

34. The method of claim 18, wherein $p_{min}$ is up to 10% less than the slowness of reflection signals from the deepest reflective surface of interest and $p_{max}$ is up to 5% greater than the slowness of reflection signals from the shallowest reflective surface of interest.

35. The method of claim 18, wherein said field records are obtained from a marine survey, $p_{min}$ is up to 5% less than the slowness of reflection signals from the deepest reflective surface of interest, and $p_{max}$ is up to 5% greater than the slowness of reflective signals through water in the area of interest.

36. The method of claim 18, wherein $p_{min}$ is up to 5% less than the slowness of reflection signals from the deepest reflective surface of interest and $p_{max}$ is up to 5% greater than the slowness of reflection signals from the shallowest reflective surface of interest.

37. The method of claim 18, wherein said slowness limits $p_{min}$ and $p_{max}$ are determined by reference to a velocity or slowness function of the primary reflection signals derived by performing a semblance or a pre-stack time migration analysis on said amplitude data.

38. The method of claim 28, wherein said slowness limits $p_{min}$ and p, are determined by reference to a velocity or slowness function of the primary reflection signals derived by performing a semblance or a pre-stack time migration analysis on said amplitude data.

39. The method of claim 30, wherein said slowness limits $p_{min}$ and $p_{max}$ are determined by reference to a velocity or slowness function of the primary reflection signals derived by performing a semblance or a pre-stack time migration analysis on said amplitude data.

40. The method of claim 34, wherein said slowness limits $p_{min}$ and $p_{max}$ are determined by reference to a velocity or slowness function of the primary reflection signals derived by performing a semblance or a pre-stack time migration analysis on said amplitude data.

41. The method of claim 18, wherein said assembled amplitude data are transformed using a hyperbolic Radon transformation.

42. The method of claim 18, wherein an offset weighting factor $x^n$ is applied to said assembled amplitude data, wherein x is offset and $0<n<1$.

43. The method of claim 18, wherein said assembled data are uncorrected for normal moveout.

44. The method of claim 28, wherein said assembled data are uncorrected for normal moveout.

45. The method of claim 30, wherein said assembled data are uncorrected for normal moveout.

46. The method of claim 34, wherein said assembled data are uncorrected for normal moveout.

47. The method of claim 37, wherein said assembled data are uncorrected for normal moveout.

48. The method of claim 38, wherein said assembled data are uncorrected for normal moveout.

49. The method of claim 4, wherein j is from about 125 to about 1000.

50. The method of claim 5, wherein j is from about 250 to about 1000.

51. The method of claim 1, wherein $p_{min}$ is up to 20% less than the slowness of reflection signals from the deepest reflective surface of interest.

52. The method of claim 1, wherein said field records are obtained from a marine survey and $p_{max}$ is up to 20% greater than the slowness of reflective signals through water in the area of interest.

53. The method of claim 1, wherein $p_{max}$ is up to 20% greater than the slowness of reflection signals from the shallowest reflective surface of interest.

54. The method of claim 1, wherein said field records are obtained from a marine survey, $p_{min}$ is up to 20% less than the slowness of reflection signals from the deepest reflective surface of interest, and $p_{max}$ is up to 20% greater than the slowness of reflective signals through water in the area of interest.

55. The method of claim 1, wherein $p_{min}$ is up to 20% less than the slowness of reflection signals from the deepest reflective surface of interest and $p_{max}$ is up to 20% greater than the slowness of reflection signals from the shallowest reflective surface of interest.

56. The method of claim 1, wherein said field records are obtained from a marine survey, $p_{min}$ is up to 20% less than the slowness of reflection signals from the deepest reflective surface of interest, and $p_{max}$ is up to 10% greater than the slowness of reflective signals through water in the area of interest.

57. The method of claim 1, wherein $p_{min}$ is up to 20% less than the slowness of reflection signals from the deepest reflective surface of interest and $p_{max}$ is up to 10% greater than the slowness of reflection signals from the shallowest reflective surface of interest.

58. The method of claim 1, wherein said field records are obtained from a marine survey, $p_{min}$ is up to 20% less than the slowness of reflection signals from the deepest reflective surface of interest, and $p_{max}$ is up to 5% greater than the slowness of reflective signals through water in the area of interest.

59. The method of claim 1, wherein $p_{min}$ is us to 20% less than the slowness of reflection signals from the deepest reflective surface of interest and $p_{max}$ is up to 5% greater than the slowness of reflection signals from the shallowest reflective surface of interest.

60. The method of claim 1, wherein said field records are obtained from a marine survey, $p_{min}$ is up to 10% less than the slowness of reflection signals from the deepest reflective surface of interest, and $p_{max}$ is up to 5% greater than the slowness of reflective signals through water in the area of interest.

61. The method of claim 1, wherein $p_{min}$ is up to 10% less than the slowness of reflection signals from the deepest reflective surface of interest and $p_{max}$ is up to 5% greater than the slowness of reflection signals from the shallowest reflective surface of interest.

62. The method of claim 1, wherein said field records are obtained from a marine survey, $p_{min}$ is up to 5% less than the slowness of reflection signals from the deepest reflective surface of interest, and $p_{max}$ is up to 5% greater than the slowness of reflective signals through water in the area of interest.

63. The method of claim 1, wherein $p_{min}$ is up to 5% less than the slowness of reflection signals from the deepest reflective surface of interest and $p_{max}$ is up to 5% greater than the slowness of reflection signals from the shallowest reflective surface of interest.

64. The method of claim 57, wherein said Radon transformation is applied within defined slowness limits $p_{min}$ and $p_{max}$, where $p_{min}$ is a predetermined minimum slowness less than the slowness of reflection signals from the deepest reflective surface of interest and $p_{max}$ is a predetermined maximum slowness greater than the slowness of reflection signals from the shallowest reflective surface of interest.

65. The method of claim 61, wherein said Radon transformation is applied within defined slowness limits $p_{min}$ and $p_{max}$, where $p_{min}$ is a predetermined minimum slowness less than the slowness of reflection signals from the deepest reflective surface of interest and $p_{max}$ is a predetermined maximum slowness greater than the slowness of reflection signals from the shallowest reflective surface of interest.

66. The method of claim 49, wherein said assembled data are uncorrected for normal moveout.

67. The method of claim 57, wherein said assembled data are uncorrected for normal moveout.

68. The method of claim 61, wherein said assembled data are uncorrected for normal moveout.

69. The method of claim 64, wherein said assembled data are uncorrected for normal moveout.

\* \* \* \* \*